(12) United States Patent
Tsukishima et al.

(10) Patent No.: US 6,650,286 B2
(45) Date of Patent: Nov. 18, 2003

(54) METHOD OF COLLECTING INFORMATION OF PHYSICAL DISTRIBUTION OF PRODUCTS AND SYSTEM FOR OFFERING INFORMATION OF PRODUCT POSITIONS

(75) Inventors: Takahiro Tsukishima, Zushi (JP); Masayuki Kan, Yokohama (JP); Kyoji Chiba, Hadano (JP); Koichi Kitamura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/826,871

(22) Filed: Apr. 6, 2001

(65) Prior Publication Data
US 2002/0050945 A1 May 2, 2002

(30) Foreign Application Priority Data

Nov. 1, 2000 (JP) ........................................ 2000-334869
Nov. 1, 2000 (JP) ........................................ 2000-334870

(51) Int. Cl.[7] ............................. G01S 5/02; H04B 7/185
(52) U.S. Cl. ............................. 342/357.13; 342/357.07; 342/357.1; 342/357.09; 701/213
(58) Field of Search ........................ 342/357.13, 357.1, 342/357.09, 357.07; 701/213

(56) References Cited

U.S. PATENT DOCUMENTS 5,922,040 A * 7/1999 Prabhakaran ................ 701/117
6,327,533 B1 * 12/2001 Chou .......................... 701/207

* cited by examiner

Primary Examiner—Theodore M. Blum
(74) Attorney, Agent, or Firm—Antonelli, Terry, Stout & Kraus, LLP

(57) ABSTRACT

A position information acquiring apparatus for receiving an electric wave and for on the basis of the received signal, acquiring the position information exhibiting the position where the product is kept to record successively the position information thus acquired is packed together with an objective matter of conveyance in a package box and then is operated in the state of being able to be moved to receive an electric wave signal radiated from the GPS satellite group to acquire successively the position information. On the basis of the position information, a map of a part corresponding to the position information is retrieved from map information which is previously obtained to carry out an output for showing visibly the resultant partial map and a symbol with which the position contained in a position history information is shown on the map.

18 Claims, 32 Drawing Sheets

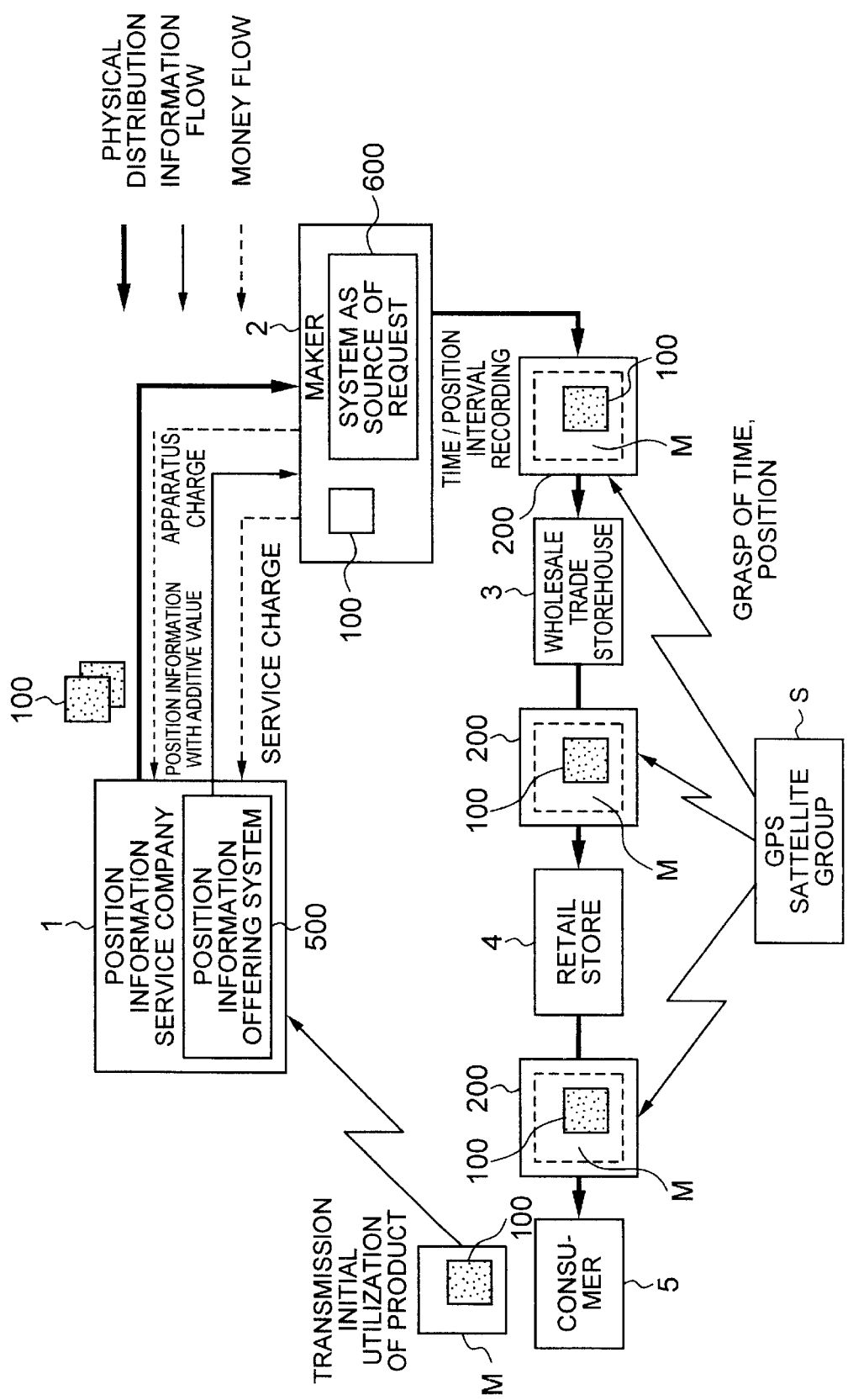

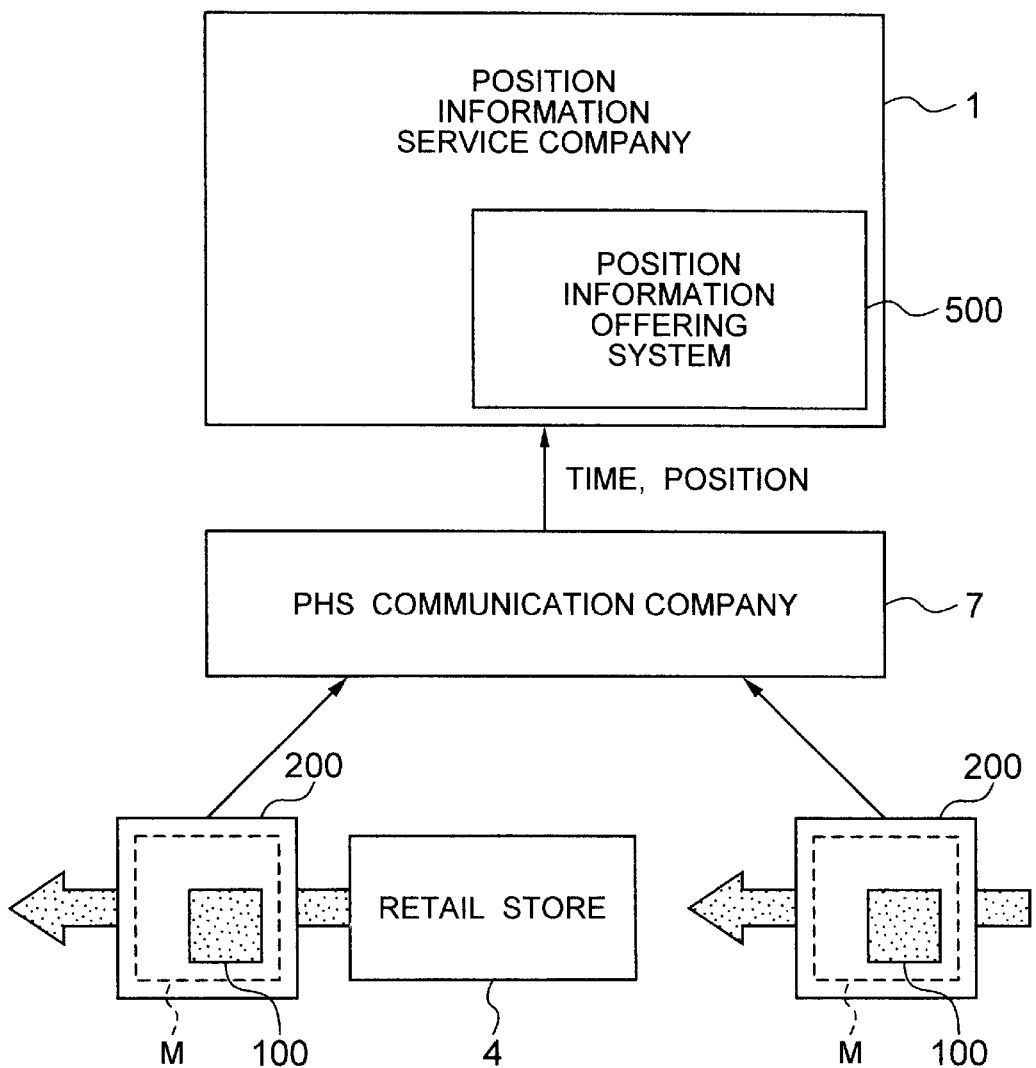

FIG. 6C
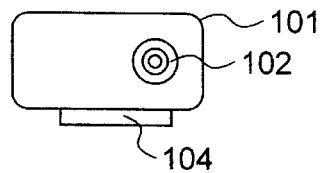
FIG. 6A    FIG. 6B    FIG. 6E
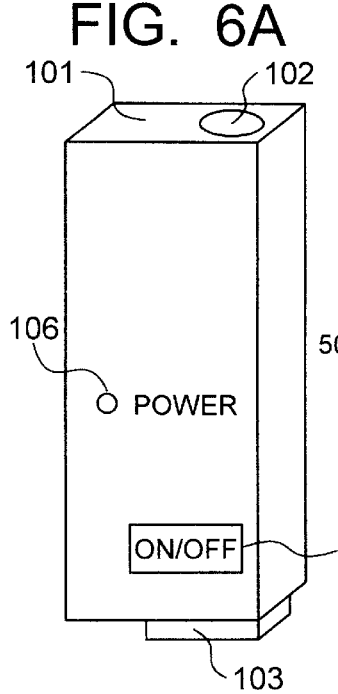 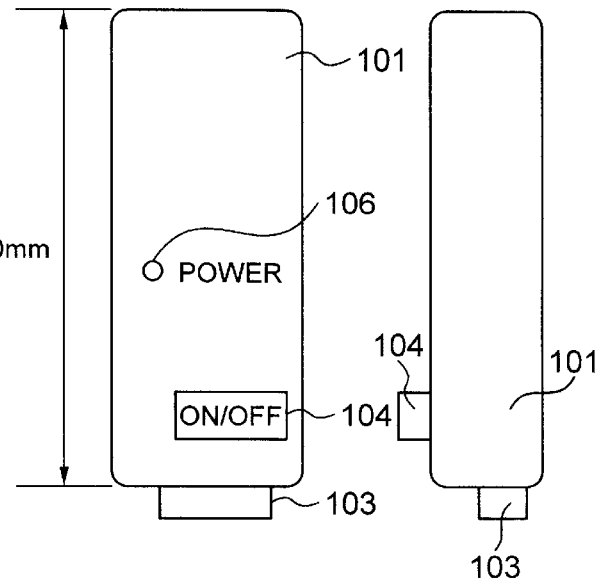
FIG. 6D
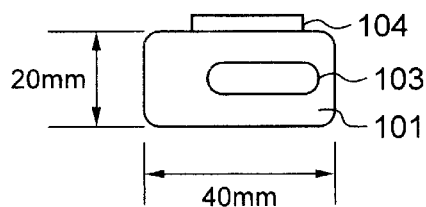

FIG. 15

| DATE | TIME | LONGITUDE | LATITUDE |
|---|---|---|---|
| 2000.07.06 | 15.42.25 | E139.42.25 | 35.40.11 |
| ⋮ | ⋮ | ⋮ | ⋮ |

1151 — DATE
1152 — TIME
1153 — LONGITUDE
1154 — LATITUDE

FIG. 33

| | | | 5531 5532 5533 5534 |

| DATE | TIME | PLACE NAME | (ESTIMATION) PLACE WHERE PRODUCT IS KEPT |
|---|---|---|---|
| 2000.07.06 | 15.42.25 | 5-3, XXX 2-CHOME, SHINJIKU-KU TOKYO | COMPANY X, FACTORY Y |
| ⋮ | ⋮ | ⋮ | ⋮ |

METHOD OF COLLECTING INFORMATION OF PHYSICAL DISTRIBUTION OF PRODUCTS AND SYSTEM FOR OFFERING INFORMATION OF PRODUCT POSITIONS

BACKGROUND OF THE INVENTION

1. Field of the Invention

The present invention relates in general to the technology for collecting information exhibiting the movement situation of products to offer the information thus collected. More particularly, the invention relates to the technology for moving, together with a product, an apparatus for acquiring the information of the place where the product is kept to collect information exhibiting the movement situation of the product, and the technology for offering and utilizing the information which is acquired by the above-mentioned technology and which exhibits the movement situation of the product.

2. Description of the Related Art

In general, many products from the electrical products down are manufactured in the factories and packed up with the package members to be shipped. Recently, the products are directly delivered from the factories to consumers in some cases. In many cases, however, the products are forwarded to consumers through the intermediate processes such as storehouses, wholesalers and retailers. That is, the factories carry out solely the production. Other traders take partial charge of the distribution and the selling.

The adoption of such a procedure may also be said to be more effective in terms of the partial charge of a role than the above-mentioned direct delivery. On the other hand, there arises the problem that the stagnating of the products occurs in the intermediate process through which the products which have been shipped are forwarded to consumers.

Such stagnating of the products in the intermediate process is preferably dissolved from a viewpoint of forwarding the products for a short period of time. In addition, it is desired to reduce the stagnating from a viewpoint as well of compressing the stock of the products. For this reason, many traders who offer the products discuss what the physical distribution should be from the necessity of realizing the reduction of the cost in the physical distribution, and the speedy offer of the products. In order to achieve this, it is required to collect the information exhibiting the distributive flow of the products to grasp the movement situation of the products after shipping. Then, it is desired to offer the information which relates to the movement of the products and which is easy to be utilized.

Generally, after the products have been shipped to be delivered to the distribution traders, the maker can be aware of the situation after having shipped the products on the basis of the products sent back, the user registration and the like. However, it is difficult to be aware of to where the products have been transported, where and how the products-stagnate until the products have been delivered to consumers.

As the means for being aware of the situation of the products after shipping, typically, there is a method of inquiring the intermediate trader about the stock situation of the products using the telephone or the like. In this method, however, the number of stocked products in that intermediate trader at a certain time point is only found out to the utmost. Therefore, in that method, the actual movement situation such as from where to where the products have been moved, where how many days the products were present is not grasped with respect to the individual products.

In addition, it is conceivable that with respect to the products which have been stocked/taken in/out of the storehouse or the like, the products are individually confirmed whenever having been stocked/taken in/out of the storehouse or the like in order to investigate the movement situation of the products. However, the work of confirming individually the products which have been stocked/taken in/out of the storehouse or the like in large quantities becomes a large burden for the intermediate traders. Therefore, since it is difficult to obtain the cooperation of the intermediate traders, the realization thereof is not easily carried out.

In addition, even if the investigation thereof can be carried out, it is required to sum up the information which is used to grasp the places where the products are kept, and the movement situation to produce the document therefor. As a result, however, there arises the problem that it costs much labor.

SUMMARY OF THE INVENTION

In the light of the foregoing, the present invention has been made in order to solve the above-mentioned problems associated with the prior art, and it is therefore an object of the present invention to provide the technology for collecting information exhibiting the movement situation of the products to offer the information thus collected. In addition, it is another object of the present invention to provide the technology for offering the information exhibiting the movement situation of the products in the form of being easy to be utilized.

In order to attain the above-mentioned objects, the present invention employs a position information acquiring apparatus for receiving an electric wave to acquire the position information, exhibiting the place where the product is kept, on the basis of the received signal and also to record successively the position information thus acquired. This apparatus is operated in the state of being able to be moved together with the objective matter of conveyance to receive an electric wave to acquire successively the position information.

In addition, in order to attain the above-mentioned objects, according to the present invention, position history information of the product which is stored in a storage device and which contains time information containing a date and information exhibiting the position where the product is kept at the time of interest is read out, and on the basis of the position information contained in the position history information, a map of a part in which the position exhibited by the position information of interest is contained is retrieved from map information which is previously prepared, and also an output for showing visibly the resultant partial map and a symbol with which the position information contained in the position history information is shown on the map is carried out.

BRIEF DESCRIPTION OF THE DRAWINGS

The above and other objects as well as advantages of the present invention will become clear by the following description of the present embodiments of the present invention with reference to the accompanying drawings, wherein:

FIG. 4 is a schematic view useful in explaining the outline of a fourth embodiment with respect to a service of offering the movement situation of products to which the present invention is applied;

FIG. 5 is a schematic view useful in explaining the outline of a fifth embodiment with respect to a service of offering the movement situation of products to which the present invention is applied;

FIG. 6A is a perspective view showing a typical exterior appearance of a physical distribution information collecting apparatus, FIG. 6B is a front view of the physical distribution information collecting apparatus, FIG. 6C is a plan view thereof, FIG. 6D is a bottom view thereof, and FIG. 6E is a side elevational view thereof;

FIG. 15 is a diagram showing schematically the state of storing data in a recording unit;

FIG. 33 is a schematic diagram useful in explaining a positional example of a time and a place name correspondence table which is generated in a position information offering system;

DETAILED DESCRIPTION OF THE EMBODIMENTS

Figure 1:
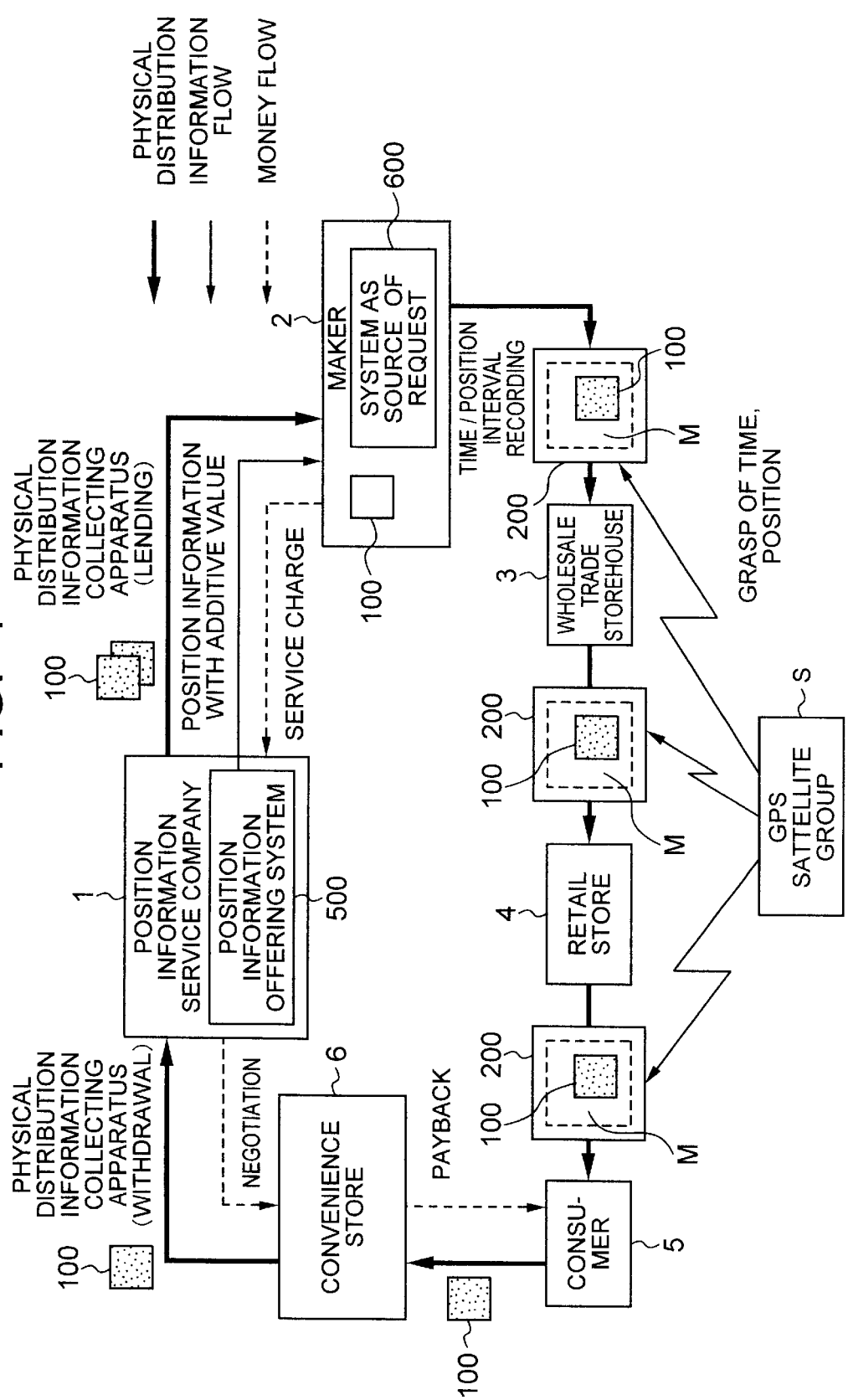
FIG. 1 is a schematic view useful in explaining the outline of a first embodiment with respect to a service of offering the movement situation of products to which the present invention is applied.

The preferred embodiments of the present invention will hereinafter be described in detail with reference to the accompanying drawings. The description will now be given with respect to the outline of a service of collecting the information relating to the movement state of products to offer the information thus collected.

<Outline of Service of Offering Information Relating to Movement Situation of Products>

The outlines of a service of offering information relating to movement situation of products to each of which the present invention is applied are shown in FIGS. 1 to 5. In the present invention, a position information service company 1 collects the information of the movement situation of the products. In addition, the position information service company 1 offers the collected result, and the information which has been obtained in such a way that the collected result is processed in accordance with a request to add the additive value thereto, to a maker 2 of the products as the enterprise as the source of the request. A product M is packed in the shipping in the maker 2 to be sent to a consumer 5 through a wholesale storehouse 3, and a retail store 4.

In the present invention, first of all, the position information service company 1 acquires the movement situation information exhibiting through what route the product has been moved until it is forwarded to the consumer after having been shipped from the maker 2. Secondary, the position information service company 1 offers the acquired movement situation information to the maker 2 as the client. For the acquirement of the information, firstly, the information of the place where the product is kept (e.g., the latitude and the longitude) and also the time at that time point (including the date, i.e., the year, the month and the day) need to be collected, respectively. Secondary, the information exhibiting the place where the collection is carried out, and the time information must be transmitted from the position information service company 1, respectively. Some forms will hereinbelow be shown with respect therewith.

In this connection, the movement situation information may also be collected by the maker itself. In this case, the position information service company 1 and the maker 2 become the same subject. In addition, the position information service company is the expression for the convenience of the description of the embodiments. The present invention is not intended to be limited to the form as the company. The subject may be available as long as it is substantially capable of collecting and offering the position information. With respect to the maker, the intermediate trader or the like as well, the subject may be available as long as it may take part in the production and the distribution of the products.

The collection of the position information is basically carried out by receiving an electric wave radiated from the outside. More specifically, as shown in FIG. 1, FIG. 2, FIG. 3 and FIG. 4, respectively, the electric wave radiated from a GPS satellite group S is received to acquire the position information. In addition, as shown in FIG. 5, there may be adopted the construction in which the measurement of the position is carried out using a position registration function in the cellular wireless communication and the position information is offered to the position information service company 1 through a PHS communication company 7.

In this case, the position, for example, is exhibited by the information specifying the area the position of which is registered. As for the information specifying the area, for example, the area identifier exhibiting the area, the latitude and the longitude of the place where an antenna is kept in the area, the address of the place where the antenna is kept in the area, or the like may be employed.

By the way, in the present invention, as the simplest case, only the position information may be collected. However, the present invention is not intended to be limited thereto. In order to grasp the movement situation of the products in detail, the time information is also important information. Therefore, it is assumed that in the following embodiments, the time information as well as the position information are acquired. For the acquirement of the time information, for example, the time information is acquired on the basis of the signal contained in the electric wave radiated from the GPS satellite group; time means is provided and on the basis of the information therefrom, the time information is acquired; the time information is acquired by utilizing a clock included in the cellular wireless communication terminal; and so forth.

Figure 2:
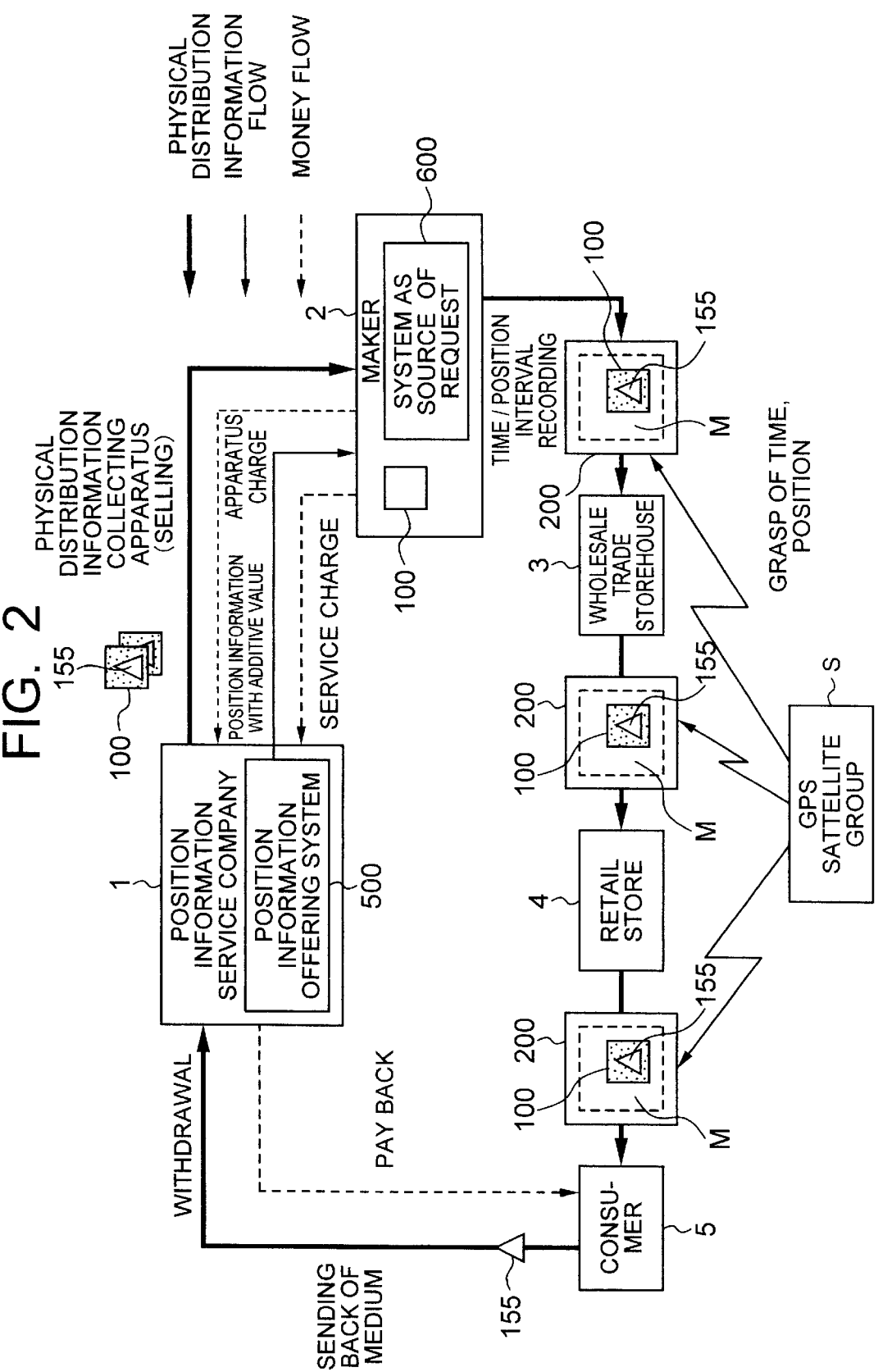
FIG. 2 is a schematic view useful in explaining the outline of a second embodiment with respect to a service of offering the movement situation of products to which the present invention is applied.
Figure 3:
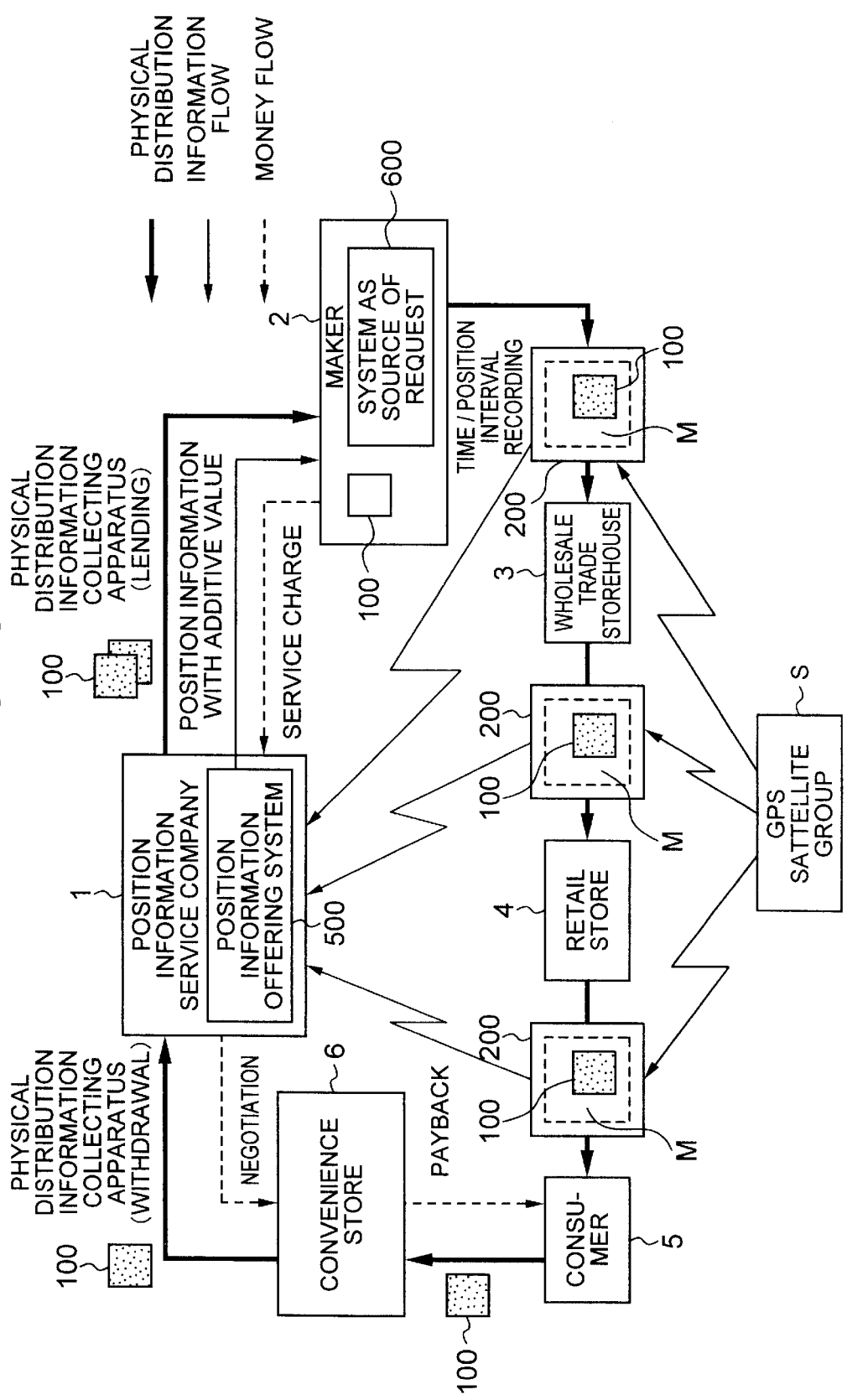
FIG. 3 is a schematic view useful in explaining the outline of a third embodiment with respect to a service of offering the movement situation of products to which the present invention is applied.

As an apparatus for collecting the position information, for example, a physical distribution information collecting apparatus 100 such as a position history recorder or a position information acquiring apparatus which will be described later is employed. Such an apparatus is placed in the state in which it is moved together with the objective matter in order to acquire the information exhibiting the position of the objective matter. As for the method of realizing the state in which the apparatus is moved together with the objective matter, for example, there are the method wherein as shown in FIG. 1, FIG. 3 and FIG. 5, the physical distribution information collecting apparatus 100 is packed together with the product M as the objective matter in a package box 200, the method wherein as shown in FIG. 2 and FIG. 4, the apparatus 100 is incorporated in the product M, and the like.

The transmission of the acquired information to the position information service company may be carried out in accordance with the accumulation collection method, the non-periodical collection method or the like for example. In the accumulation collection method, the apparatus in which the position information has been accumulated as the history information is collected to read out therefrom the position information, thereby carrying out the information transmission. For this, for example, two forms are possible. That is, there are possible the form in which as shown in FIG. 1, the physical distribution information collecting apparatus 100 itself is collected, and the form in which as shown in FIG. 2, a recording medium 155 having the position history information recorded therein is collected. In the non-periodical collection method, as shown in FIG. 3, the information transmission is carried out by using the cellular wireless communication terminal as described above. For this, for example, two forms are possible. That is, there are possible the form in which after having collected the position information, on all such occasions, the transmission of the position information is carried out, and the form in which the position information is temporarily stored and the transmission of the information is suitably carried out. In addition, with respect to the information collection as well in these cases, as described above, there are the form in which the position information is acquired using the cellular wireless communication terminal, in particular, the PHS terminal, and the form in which the position information is collected using the GPS satellite group. Also, as shown in FIG. 5, the acquirement of the position information and the transmission of the position information may be carried out together with each other using the physical distribution information collecting apparatus 100 having the cellular wireless communication terminal.

In addition, as shown in FIG. 4, there can be adopted the construction in which the product M itself is provided with the physical distribution information collecting apparatus 100 such as the position history recorder to acquire the position history information and at a time point when the product M is electrically connected to the network to start the use thereof, the acquired position history information is transmitted to the position information service company 1. This is possible when the product has such a function.

The acquired information exhibiting the movement situation of the product is offered from the position information service company 1 to the source 2 of the request. Then, the various kinds of offering forms are possible therefor. In addition, the various kinds of forms may also be combined with one another in order to carry out the offer. For example, a) to offer the collected data, b) to offer the collected data after the processing, c) to analyze the collected data to offer the analysis result, and so forth are possible.

In addition to the collected data, the processed data, the analyzed data and the like, other data, e.g., the map data may be prepared to offer together therewith the collected data. For example, d) to offer the collected data and the map data, respectively, e) to process the data in such a way that the movement locus can be shown on the map, to offer the collected data and the map data, respectively, and so forth are possible.

Further, f) the collected data is directly or the processed data is accessed from the source of the request to the position information service company to enable the information exhibiting the movement situation to be peruse or down loaded online, g) the collected data is directly or the processed data is stored in the recording medium to be offered, and the like are possible.

In addition thereto, as the timing of offering the position information service, for example, h) after the position information recorders have been collected by a certain number or more, or by a certain rate or more, to start the service, i) after a certain period of time has elapsed after the product becoming the acquerment object of the position information was shipped, to start the service, j) right after the shipping, to offer the service whenever necessary, and so forth are possible.

When collecting and offering the information exhibiting the movement situation of the product, the various expenses are required. For this reason, for example, as shown by broken lines in FIGS. 1 to 4, the flow of the money occurs. The product position information service company 1 imposes the charge as the compensation of the offer of the service. The product position information service company 1, as the mechanism therefor, may have the system for determining the charge and the accounting system. While in an example shown in FIG. 5, no flow of the money is shown, in this case as well, the charge can be imposed.

In addition, the product position information service company 1, as the expense, imposes the loan charge of the physical distribution information collection apparatus 100, the selling charge and the like thereof. Further, as a part of the expense, as shown in FIG. 1, FIG. 2 and FIG. 3, the payback expense, the negotiation expense and the like which occur when collecting the physical distribution information collecting apparatus 100 or the recording medium 155 may occur in some cases.

In this connection, when the product position information service company and the maker are the same subject, the problem of the request of the charge, and the payment does not occur. However, the difference does not occur in the respect in which the information collection cost occurs. Therefore, the flow of the money can be considered as the flow of the expense.

<With Respect to Physical Distribution Information Collecting Apparatus>

Next, an example of the physical distribution information collecting apparatus which is employed when acquiring the position information of the product in the present invention will hereinbelow be described with respect to the associated ones of the accompanying drawings.

The typical exterior appearance of the physical distribution information collecting apparatus is shown in FIGS. 6A to 6E. As shown in FIG. 6A, the physical distribution information collecting apparatus 100 has a rectangular parallelopiped-like case 101. In this connection, in the present embodiment, as shown in FIGS. 6A to 6E, the rectangular parallelopiped-like case 101 is subjected to the processing by which each of the emperor s mausoleums becomes the curved surface. In the front face of the case 101, a key top 104 of the power source switch, and a display unit 106 exhibiting that the power source is in the ON state are both arranged. As the power source switch, there can be employed one in which if it is manipulated once, then the ON state is held until it is manipulated again. In addition, there can be employed one in which the ON state is maintained while it is pressed using a limit switch. In the case where as in the latter, there is employed the switch in which the ON state is maintained while it is pressed, for example, there may be adopted the procedure in which the physical distribution information collecting apparatus is packed in the package box to turn ON the switch, while the physical distribution information collecting apparatus is taken out from the package box to turn OFF the switch.

Figure 10:
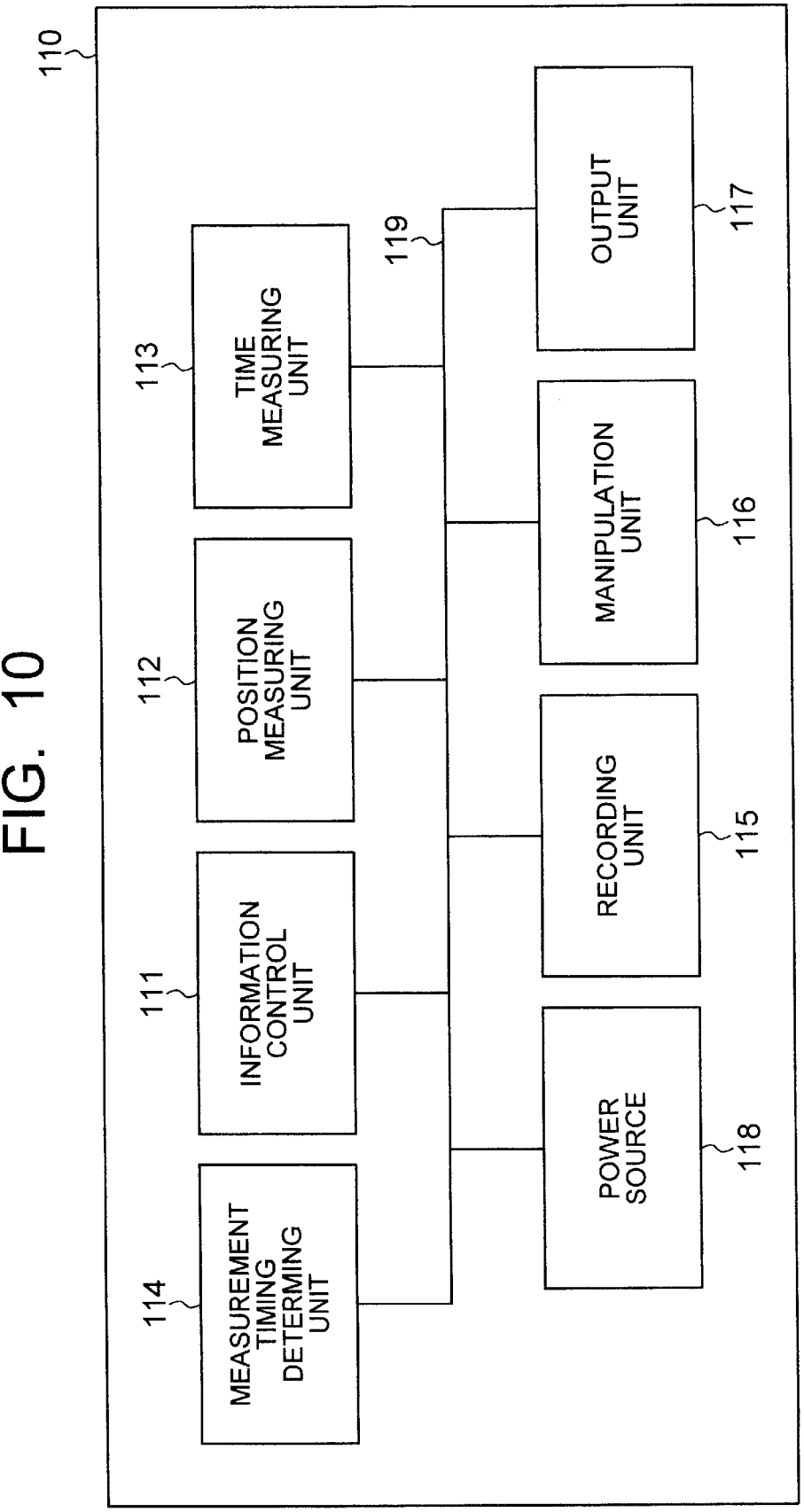
FIG. 10 is a block diagram showing an example of a configuration of a position history recording apparatus as an example of a physical distribution information collecting apparatus.

On the upper end side of the case 101, there is provided a connector 102 through which the external antenna for receiving the GPS electric wave is electrically connected. On the other hand, on the lower end side of the case 101, an output terminal 103 is provided. This output terminal 102 constitutes a part of an output unit 117 which is shown in FIG. 10 and which will be described later.

The physical distribution information collecting apparatus 100, for example, is formed in the size of 50 mm to 100 mm (length)×40 mm (width)×20 mm (thickness). Of course, the present invention is not intended to be limited thereto.

Figure 7:
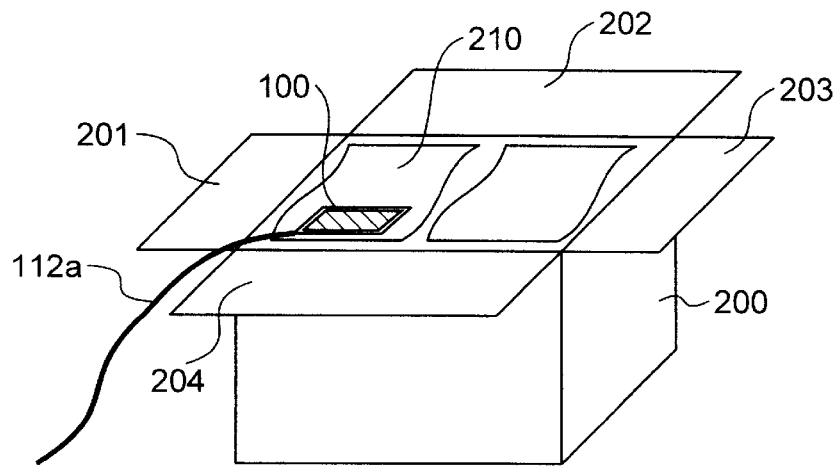
FIG. 7 is a perspective view showing the state in which the physical distribution information collecting apparatus is packed together with a product in a package box.

The physical distribution information collecting apparatus 100, in order to be placed in the state in which it can be moved together with the objective matter, is packed together with the product M in the package box 200. For example, as shown in FIG. 7, after the product has been packed, a buffer material 210 is placed in the upper space thereof, and further the physical distribution information collecting apparatus 100 is placed thereon. Then, covers 201, 202, 203 and 204 are closed, whereby the physical distribution information collecting apparatus 100 is packed together with the product in the package box 200. As the buffer material 210, for example, a corrugated board, an expandable resin plate or the like is employed.

Figures 8A, 8B, 8C:
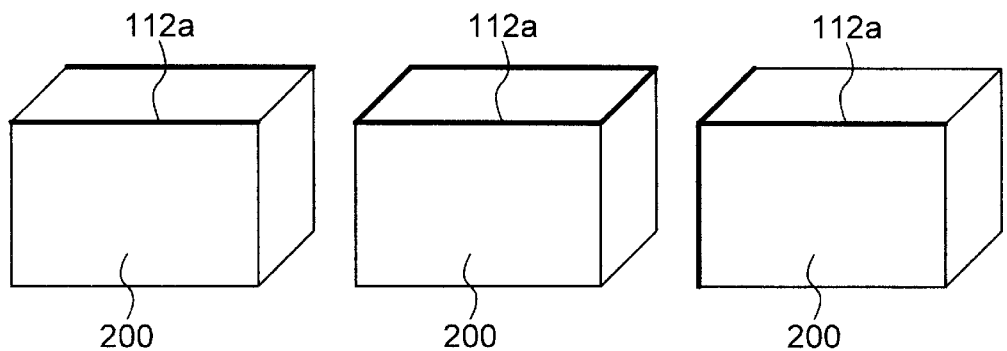
FIG. 8A, FIG. 8B and FIG. 8C are respectively perspective views each showing an example in which an external antenna of the physical distribution information collecting apparatus is attached.

In this connection, an external antenna 112a, for example, as shown in FIGS. 8A to 8C, may be arranged in the associated one of the ridge line portion of the package box 200. The external antenna 112a is fixed thereto by being covered with the adhesive tape or the like.

Figure 9:
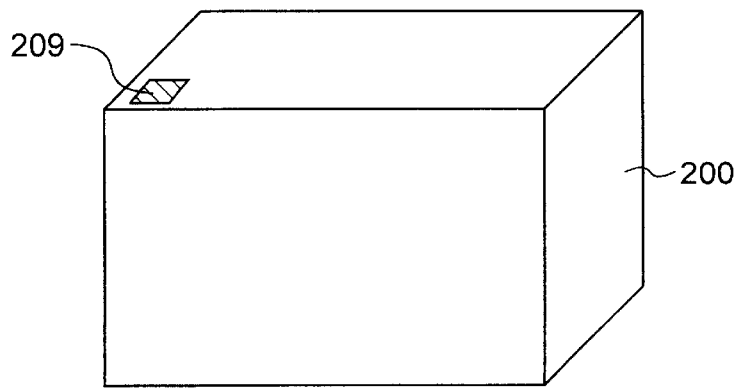
FIG. 9 is a perspective view showing another example of the package box in which the physical distribution information collecting apparatus is accommodated.

In addition, as the antenna, the internal antenna may be employed in some cases. In such cases, the physical distribution information collecting apparatus is arranged in a part of the package box 200, i.e., in the lower part thereof, and a window 209 is provided in the part with which the physical distribution information collecting apparatus is intended to be covered (refer to FIG. 9). As a result, in the case as well of the internal antenna, the better state of receiving the electric wave can be expected.

By the way, a pocket for attaching therein the physical distribution information collecting apparatus 100 may be previously provided in the package box 200. The pocket may have the shape and the size in such a way that when inserting thereinto the physical distribution information collecting apparatus, a key top 104 as shown in FIG. 6A is pressed.

Next, the physical distribution information collecting apparatus will hereinbelow be described by taking several examples. In the following examples, the description will be mainly given with respect to the apparatus which is of the type in which it is packed together with the product to be used. But, it is to be understood that the apparatus can be incorporated in the product. By the way, in the following description, the same constituent elements are designated with the same reference numerals, and the repeated description is omitted here for the sake of simplicity.

In FIG. 10, there is shown an example of a configuration of a position history recorder 110 as an example of the physical distribution information collecting apparatus. The position history recorder 110 shown in FIG. 10 includes an information control unit 111 for controlling the operation of the apparatus, a position measuring unit 112 for measuring a position to output the position information, a time measuring unit 113 for measuring a time to output the time information, a measurement timing determining unit 114 for generating the measurement timing for the position information and the time information, a recording unit 115 for recording therein successively the acquired information, a manipulation unit 116 for receiving the manipulation from the outside, an output unit 117 for outputting the acquired information to the outside, and a power source unit 118 for supplying the electric power with which the above-mentioned units are operated. The above-mentioned units are electrically connected to one another through a signal line 119. The whole or a part of the above-mentioned units can be constructed in the form of the common chip.

Figure 11:
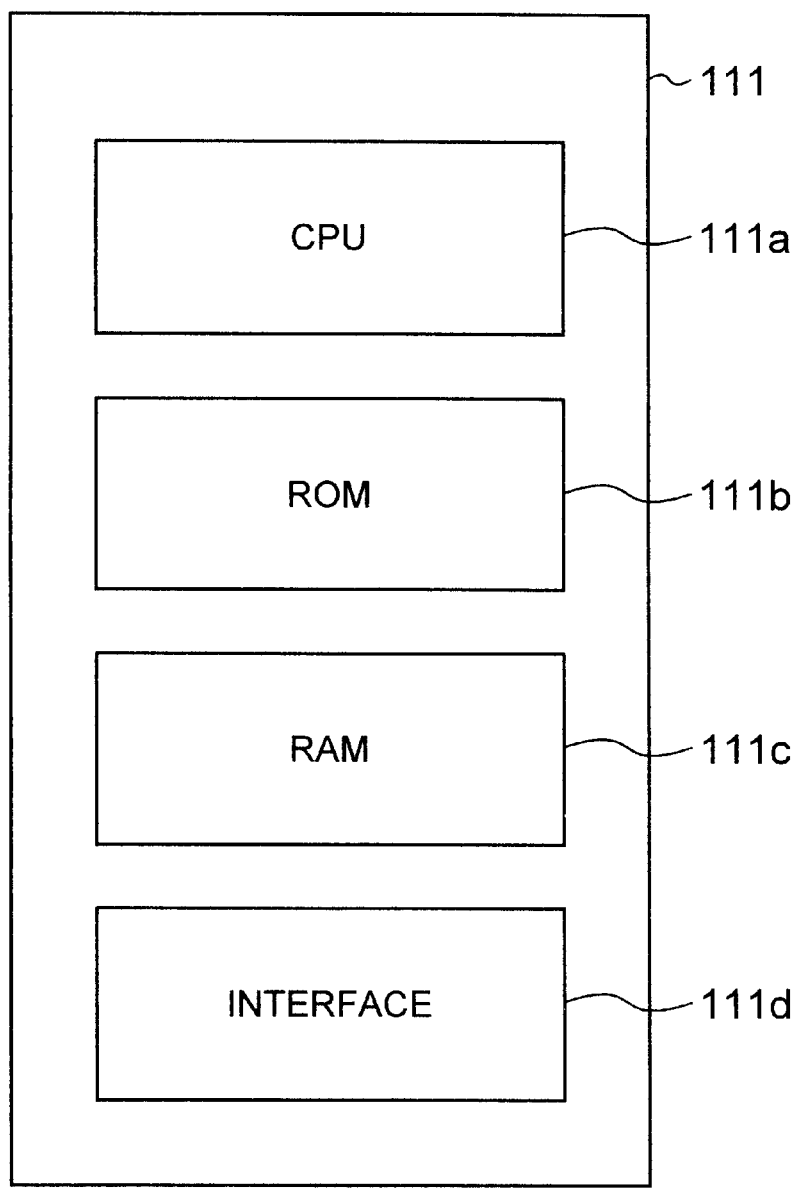
FIG. 11 is a block diagram showing an example of a hardware configuration of an information control unit which is used in a configuration of a position history recorder.

The information control unit 111, for example, as shown in FIG. 11, can be constituted by a small computer having a CPU 111a, a ROM 111b, a RAM 111c and an interface 111d. The CPU 111a is operated in accordance with the program stored in the ROM 111b. The whole or a part of the information control unit 111 may be constructed in the form of a hardware logic circuit. On the basis of the control by the information control unit 111, both of the position information and the time information are acquired, recorded and outputted. The flow of the acquirement, the recording and the output of the position information under the control by the information control unit 111 will be described later.

Figure 12:
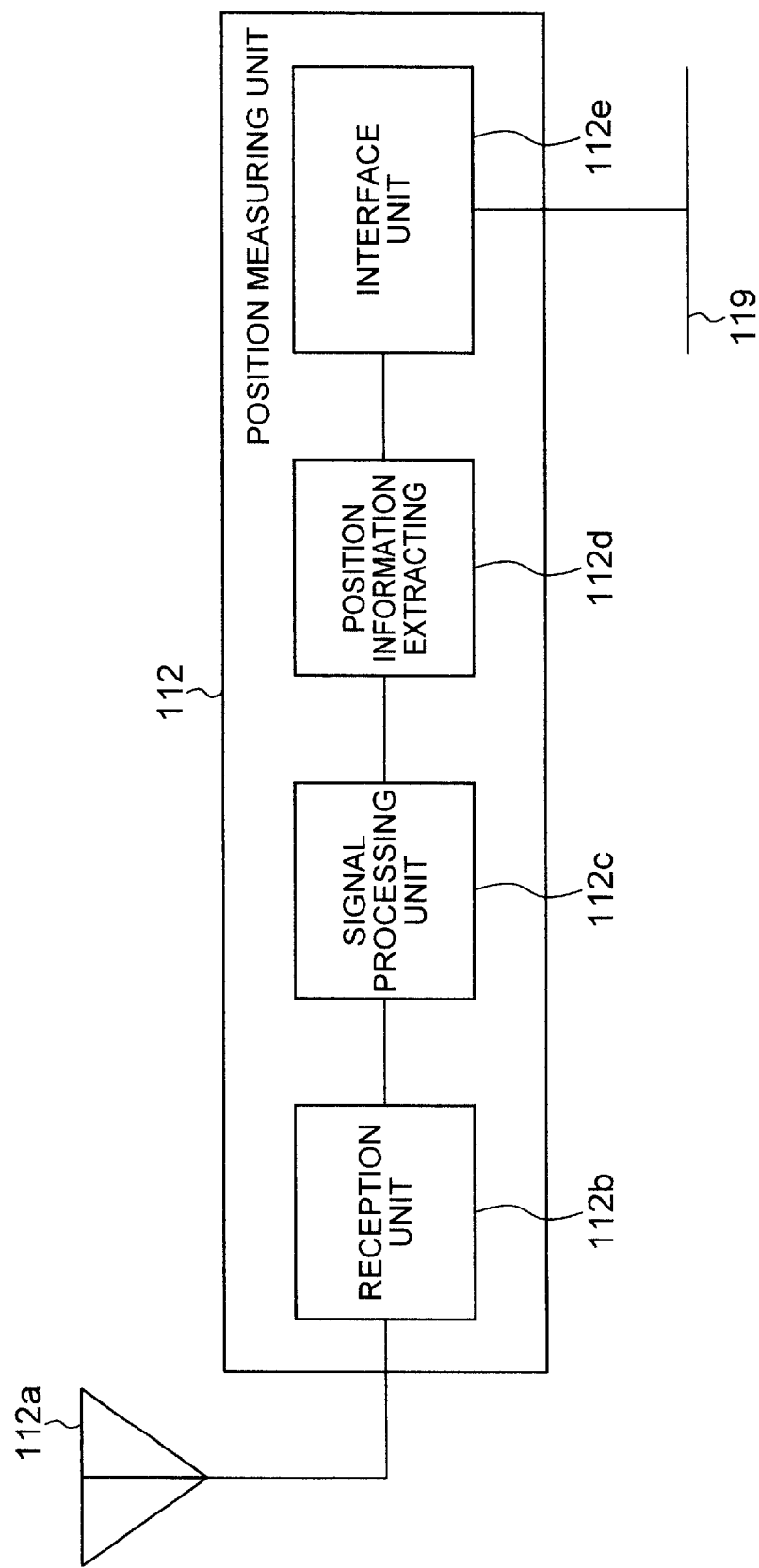
FIG. 12 is a block diagram showing an example of a configuration of a position measuring unit which is used in a configuration of a position history recorder.

The position measuring unit 112, for example, as shown in FIG. 12, includes an antenna 112a, a reception unit 112b for receiving the electric wave radiated from the GPS satellite group S to fetch the signal contained in the electric wave thus received, a signal processing unit 112c for processing the received signal, a position information extracting unit 112d for obtaining the position information from the processed signal, and an interface unit 112e for holding temporarily the obtained position information to output it to the outside. The antenna 112a is the external antenna as described above which for example, as shown in FIGS. 8A to 8C, is attached to the package box 200 as the package member. As the position information, for example, the latitude and the longitude are acquired. The reception unit 112b has the function which judges whether or not the magnitude of the electric wave is sufficiently powerful for the acquirement of the position information. Then, as a result of the judgement, when the magnitude of the electric wave is sufficiently powerful, a flag exhibiting this fact is set in the interface unit 112e. This flag is checked by the information control unit 111.

The time measuring unit 113 has a clock with a calendar as time means, and at the time when having received an instruction issued from the information control unit 111, generates the time information containing the data at that time point. In this connection, the time measuring unit 113 may be configured in such a way as to acquire the time information contained in the signal which the position measuring unit 112 has received. In this case, the position measuring unit 112 and the time measuring unit 113 do not need to be separately provided. That is, in the position measuring unit 112, the time information as well as the position information will be acquired.

The position measuring unit 112 and the time measuring unit 113 are both operated under the control by the information control unit 111 and function as the means for receiving the electric wave to acquire, on the basis of the received signal, the position information exhibiting the place where the product is kept. The position information is recorded, together with the time information, as the information associated with each other, in the form of one record in a recording unit, which will be described later, by the information control unit 111. In the present embodiment, for example, about 40 bytes or so are assigned thereto.

Figure 13:
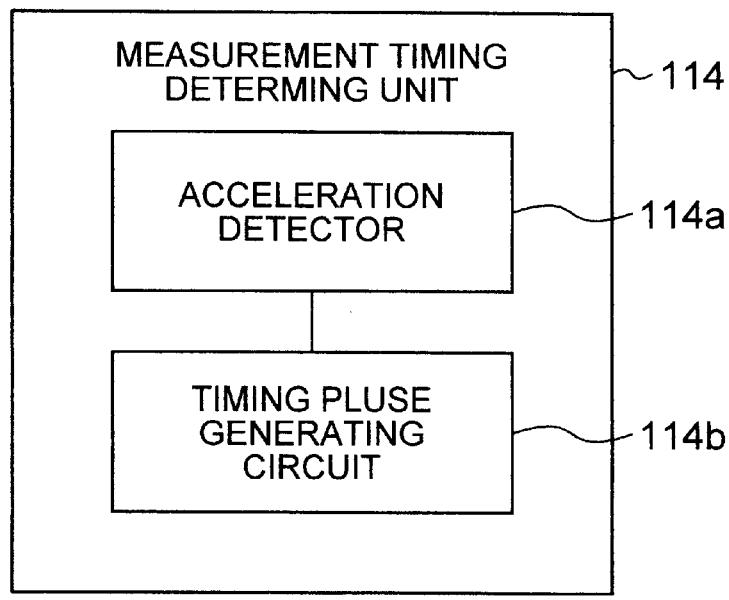
FIG. 13 is a block diagram showing an example of a configuration of a measurement timing determining unit which is used in a configuration of a position history recorder.

The measurement timing determining unit 114 functions as the means for generating the specific timing signal which means serves to generate a timing signal for the position measurement to output it. The generation of the timing signal is carried out by aiming at tracking the motion of the objective matter. That is, at the time when the measurement state of the objective matter has been changed, i.e., when the objective matter has been accelerated, an acceleration detector detects whether or not the magnitude of the acceleration is equal to or higher than a fixed level. The measurement timing determining unit 114, for example, as shown in FIG. 13, includes an acceleration detector 114a, and a timing pulse generating circuit 114b for when the output of the acceleration detector 114a is equal to or higher than a fixed level, outputting a timing pulse.

When the objective matter is at a standstill, and also when the objective matter is moved roughly at a constant speed and hence suffers only the small vibration, since the acceleration is small, the acceleration detector 114a does not generate the timing pulse. On the other hand, when the objective matter is accelerated, the acceleration detector 114a generates the timing pulse.

The position measuring unit 112 and the time measuring unit 113 are both operated in response to the timing pulse to start the measurement operations, respectively. The time measuring unit 113 outputs the time information. On the other hand, the information control unit 111 is activated in response to the timing pulse. Then, the information control unit 111 monitors the measurement in the position measuring unit 112 and the time measuring unit 113. In addition, the information control unit 111 acquires the information of the time at a time point when the effective position information has been obtained in the position measuring unit 112 to record the position information and the time information in the recorder 115.

Figure 25:
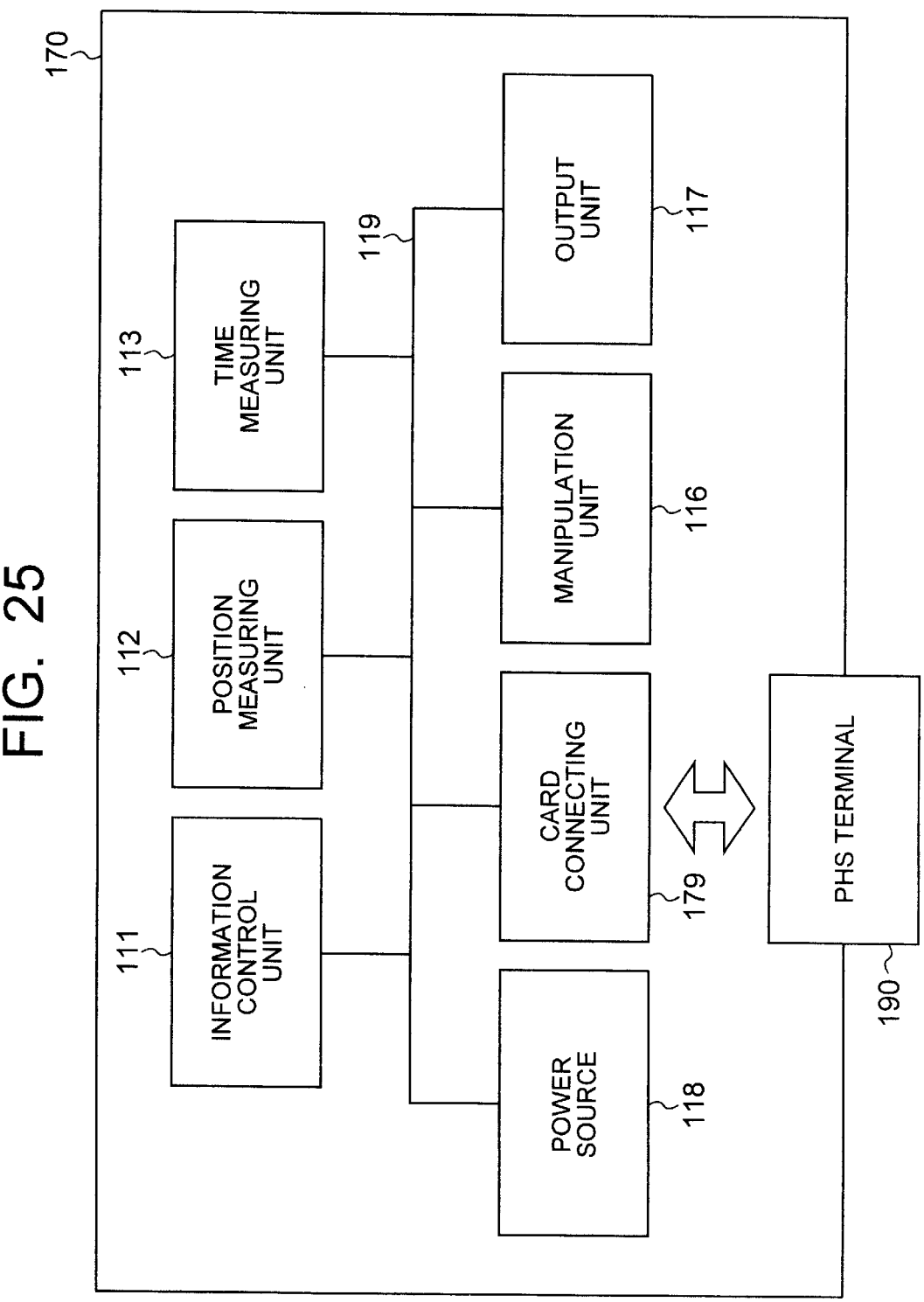
FIG. 25 is a block diagram showing another example of a configuration of a position information acquiring apparatus as one example of a physical distribution information collecting apparatus.

The recording unit functions as the means for recording therein the position information and the time information associated with each other in the form of the position history information under the control by the information control unit 111. FIG. 25 shows an example of the structure of the data which is recorded in the recording unit 115. In the example shown in FIG. 15, a date 1151, a time 1152, the longitude 1153 and the latitude 1154 are recorded in the form of one record. The recording is successively carried out.

Figure 14:
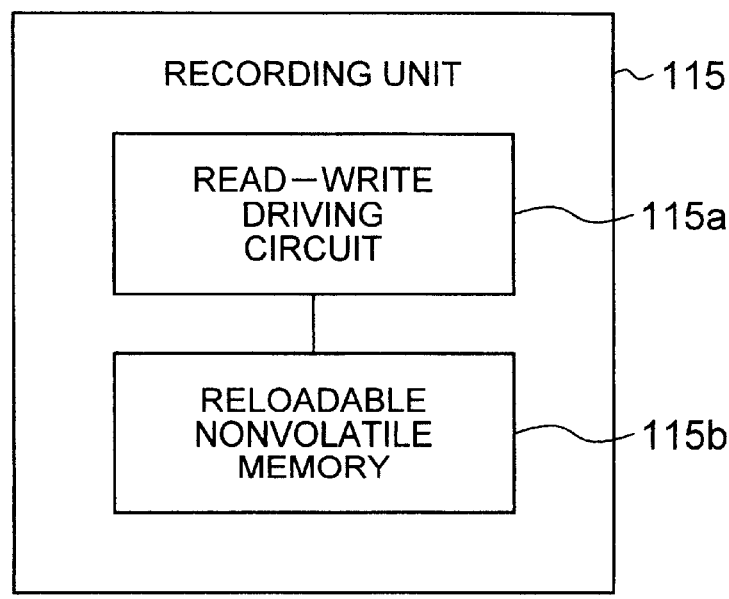
FIG. 14 is a block diagram showing an example of a configuration of a recording unit which is used in a configuration of a position history recorder.

As shown in FIG. 14, the information can be read/written from/to the recording unit 115, as the recording medium for recording the information, which includes a nonvolatile memory 115b in which the written information is kept, and a read-write driving circuit 115a therefor. This memory 115b accumulates therein successively the position information and the time information in the form of the history information for several months for example. For this reason, the memory 115b has the storage capacity with which these data can be accumulated. For example, if the information of 40 bytes as one record as described above is recorded one time a day for six months, the memory 115b has only to have the storage capacity of about 7.2 KB. On the other hand, if the information of 40 bytes as one record is recorded twelve times a day for six months, the memory 115b has only to have the storage capacity of about 87 KB. The nonvolatile memory having the storage capacity of this order is very inexpensively manufactured now.

In this connection, it is possible that if the position information is identical to each other, then the recording of the information will not be carried out. As a result, the amount of data to be recorded is greatly reduced. For example, if the acquired position information exhibits over continuous two times or more the positions where the difference therebetween falls within a predetermined range, it is possible that with respect to the position information which has been acquired on after the second time, the record thereof will not be added. As a result, when the objective matter is continuously located in the same position, one position information will be recorded, and hence the amount of recorded data can be reduced.

In addition, if the acquired position information exhibits over continuous three times or more the positions where the difference therebetween falls within a predetermined range, then the second recording is updated with the position information and the time information, which are currently acquired, as the position information and the time information which are acquired second time.

For this reason, thereafter, when the objective matter is moved, in the position where the objective matter has been present right before the movement thereof, the respective position information is held in correspondence to a time of the start of the presence and a time of the end of the presence. Therefore, the amount of recorded data can be compressed, and also it becomes possible to be aware of the stay time of the objective matter. This processing is controlled by the information control unit 111.

The recording unit 115 may be configured in such a way that the identifier for identifying the recorder of interest is recorded every position history decorder. By adopting this configuration, only when the read request made from the outside is the request entailing the identifier, and also the identifiers coincide with each other, the information control unit 111 allows the request. As a result, the recorded data can be protected in such a way as not to be read out at random.

In addition, the recording unit 115 can store therein a mail address. This mail address can be used when the contents recorded in the recording unit 115 will be transmitted towards the mail address of interest later. In particular, in the case where the physical distribution information collecting apparatus is incorporated in the product, when transmitting the mail through the product, the mail address can be effectively utilized.

The manipulation unit 116 functions as the means for issuing an instruction from the outside with respect to the operation of the position history recorder 110. More specifically, the manipulation unit 116 receives the input manipulations such as an instruction to turn ON/OFF the power source, an activation instruction and a stop instruction. In the present embodiment, the power source switch is assigned to the manipulation unit 116. By the way, the unit, which needs to be continuously operated, such as the time measuring unit 113 is preferably supplied with the electric power at all times. Therefore, the configuration can be adopted in which the supply of the electric power is not shut off even by the manipulation of turning OFF the power source switch.

The output unit 117 functions as the means for outputting the acquired information to the outside. More specifically, the output terminal 103 as shown in FIG. 6D and the circuit for making the output terminal 103 function are provided therefor.

The power source unit 118 includes a battery, a circuit for supplying the electric power of the battery to each of the units, and a circuit for carrying out the charging. The power source unit 118 is provided with the battery having the capacity with which the operation of the position history recorder 110 can be maintained for several months, e.g., for three months to six months in correspondence to the estimation in the above-mentioned recording unit 115. The battery is exchangeable. Then, the battery having the suitable capacity in correspondence to the use period of time is attached to the power source unit 118.

Figure 16:
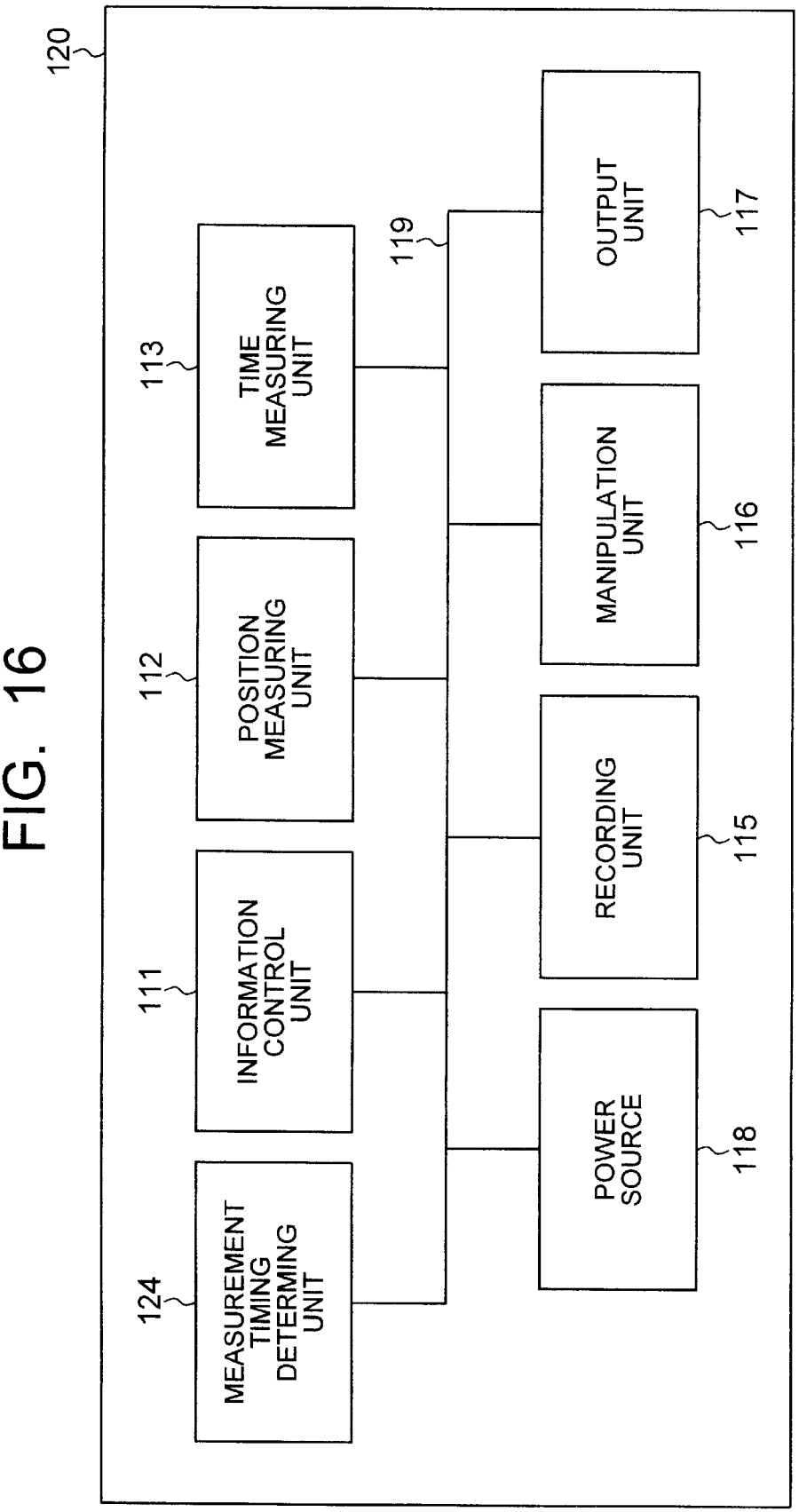
FIG. 16 is a block diagram showing another example of a configuration of a position history recorder as an example of a physical distribution information collecting apparatus.

Next, the description will hereinbelow be given with respect to an example in which the method of determining the measurement timing is different from that in the apparatus shown in FIG. 10 with reference to FIG. 16. The position history recorder 120 shown in FIG. 16 is the apparatus which is designed in such a way that the position information and the time information can be measured at the fixed intervals. For this reason, the position history recorder 120 includes a measurement timing determining unit 124 which is capable of determining the measurement timing suitable for the measurement thereof.

Figure 17:
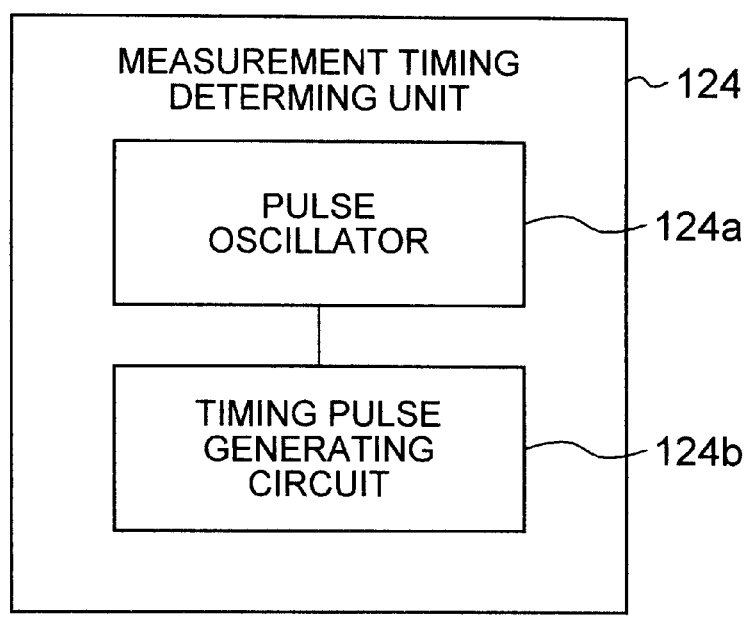
FIG. 17 is a block diagram showing another example of a configuration of a measurement timing determining unit which is used in a configuration of a position history recorder.

The measurement timing determining unit 124 generates the timing pulse at the fixed intervals to generate the above-mentioned specific timing signal on the basis of the timing pulse thus generated. For this reason, the measurement timing determining unit 124, for example, as shown in FIG. 17, includes a pulse oscillator 124a, and a timing pulse generating circuit 124b for counting the pulse outputted from the oscillator to generate the pulse at the fixed intervals. The timing pulse generating circuit 124b can be constituted by a preset counter for example. That is, the preset value is determined in accordance with at what intervals the position information is previously acquired to determine the generation timing of the timing pulse.

By the way, the preset value may be programmed in correspondence to the movement pattern of the product. For example, the preset value may be determined in such a way that since right after the shipping, the product is moved, the period of time is made short, and thereafter, since the product may be stagnated in the storehouse, the period of time is made long, and then since the product may be taken out of the storehouse to be moved again, the period of time is made short. As a result, many information which is required to grasp the movement situation is acquired and with respect to the situation which is not required so much, the amount of data can be reduced. This contributes to the power saving and the saving of the use amount of memory.

Next, the description will hereinbelow be given with respect to an example which is different in the acquirement of the time information from the above-mentioned example shown in FIG. 10 with respect to FIG. 18. A position history recorder 130 shown in FIG. 18 acquires both of the position information and the time information by utilizing the GPS. For this reason, the position history recorder 130 includes a position/time measuring unit 132 which is suitable therefor.

Figure 19:
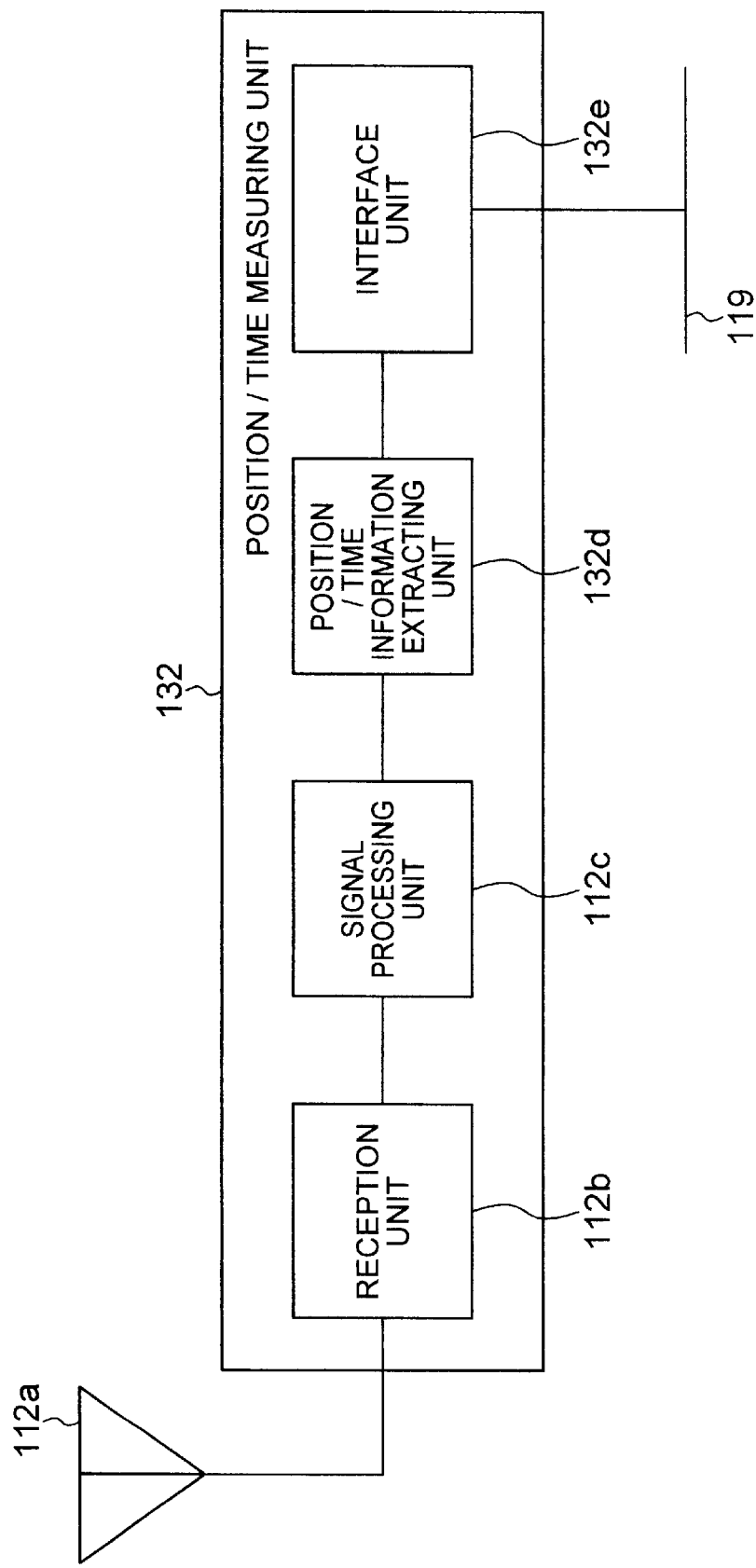
FIG. 19 is a block diagram showing an example of a configuration of a position/time measurement which is used in a configuration of a position history recorder.

This position/time measuring unit 132, as shown in FIG. 19, includes an antenna 112*a*, a reception unit 112*b* for receiving the electric wave radiated from the GPS satellite group S to fetch the signal contained therein, a signal processing unit 112*c* for processing the received signal, a position/time information extracting unit 132*d* for obtaining the position information from the processed signal, and an interface unit 132*e* for holding temporarily the obtained position information to output the obtained position information thus held to the outside. The position/time measuring unit 132 is operated similarly to the above-mentioned unit 112 shown in FIG. 12 except that the position/time information extracting unit 132*d* obtains the position information and the time information from the received signal, and the interface unit 132*e* holds temporarily the position information and the time information which have been obtained.

Figure 18:
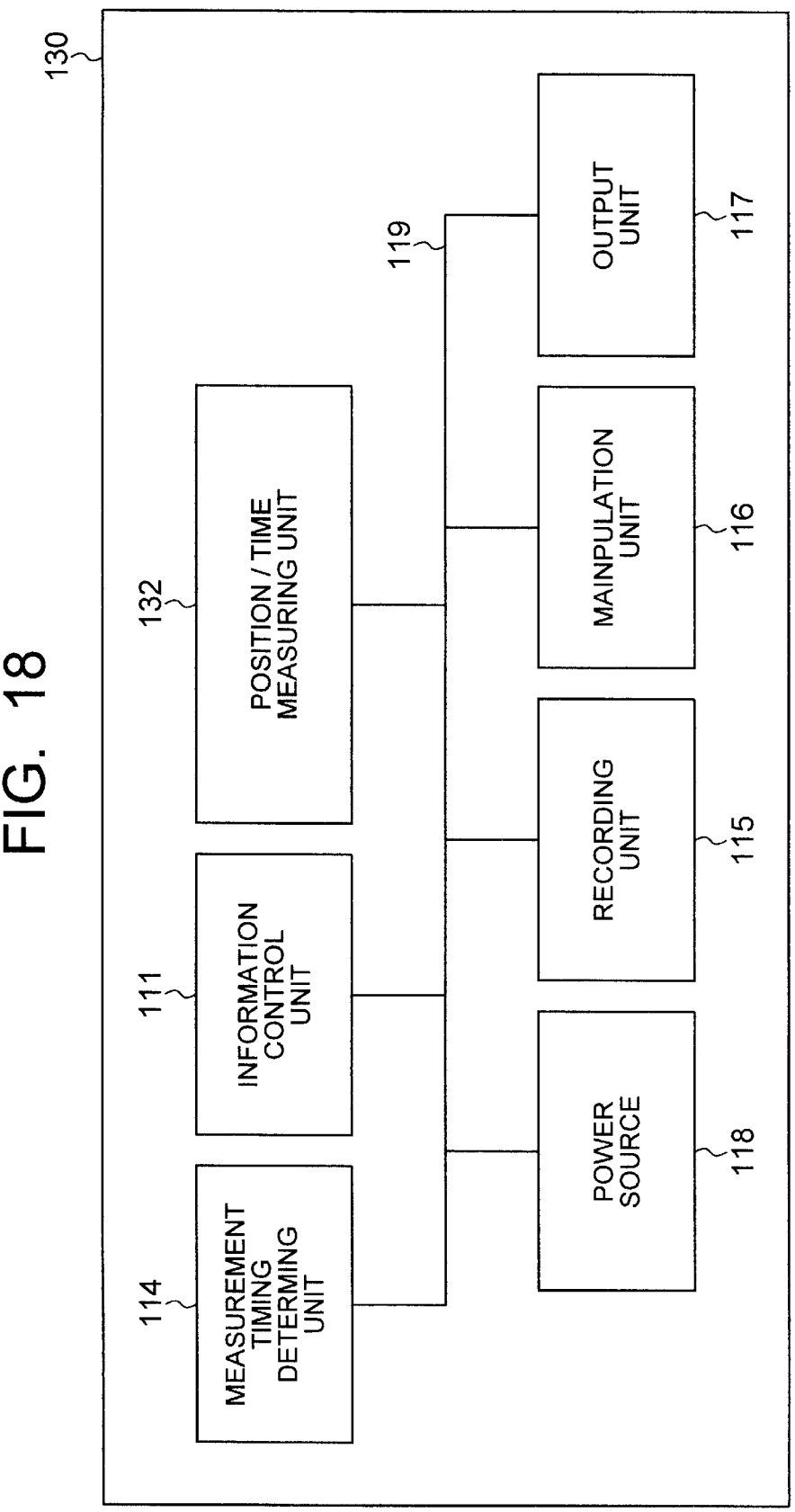
FIG. 18 is a block diagram showing still another example of a configuration of a position history recorder as an example of a physical distribution information collecting apparatus.

In the position history recorder 130 as well shown in FIG. 18, the measurement timing determining unit 114 can be made the measurement timing of determining unit 124 shown in FIG. 17.

Figure 20:
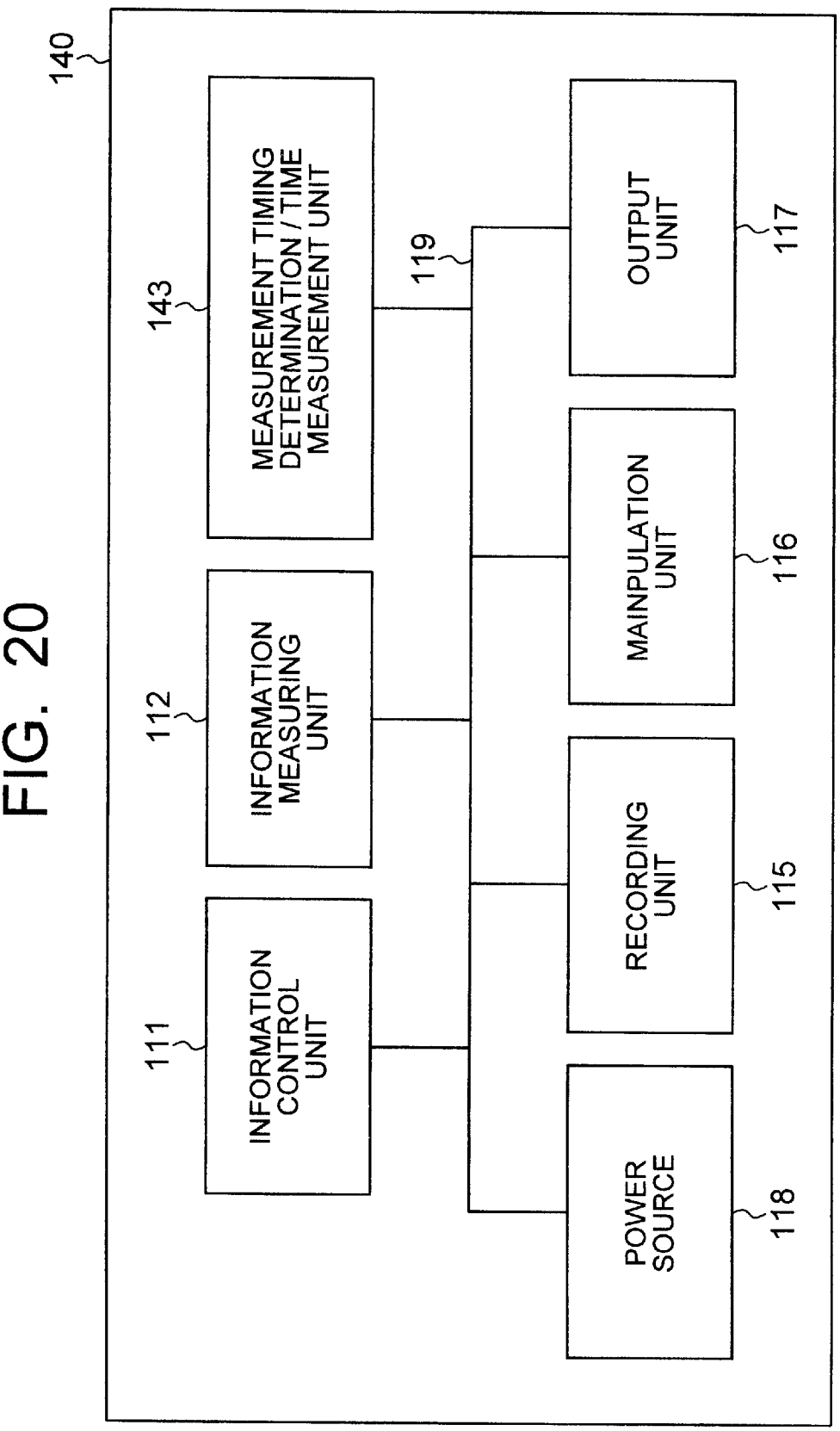
FIG. 20 is a block diagram showing still yet another example of a configuration of a position history recorder as an example of a physical distribution information collecting apparatus.

Next, the description will hereinbelow be given with respect to an example in which the acquirement of the measurement timing is different from that in each of the examples shown in FIG. 10 and FIG. 16 with reference to FIG. 20. A position history recorder 140 shown in FIG. 20 carries out the determination of the measurement timing and the measurement of the time in the same apparatus. Thus, the position history recorder 140 includes a measurement timing determination/time measurement unit 143 which is suitable therefor.

Figure 21:
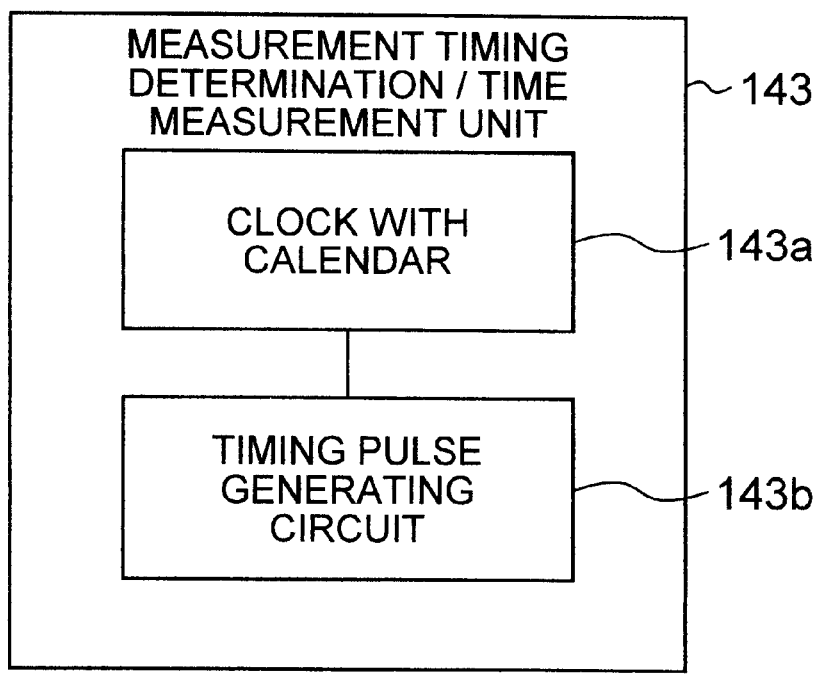
FIG. 21 is a block diagram showing an example of a configuration of a measurement timing determination/time measurement unit which is used in a configuration of a position history recorder.

The measurement timing determination/time measurement unit 143, for example, as shown in FIG. 21, includes a clock 143*a* with a calendar for generating the time information, and a timing pulse generating circuit 143*b* for generating a timing pulse on the basis of the time information which has been generated by the clock 143*b* with a calendar. When the time information generated by the clock 143*a* with a calendar fulfills a predetermined condition, the timing pulse generating circuit 143*b* generates the pulse. As the predetermined condition, a predetermined time, e.g., a certain time set every day, a certain time set every other day, the specific time on the specific date, or the like can be specified.

The predetermined condition may be previously programmed. In this example, the position information can be acquired by specifying the necessary time. Therefore, the collection of the information can be finely carried out as may be necessary.

Figure 22:
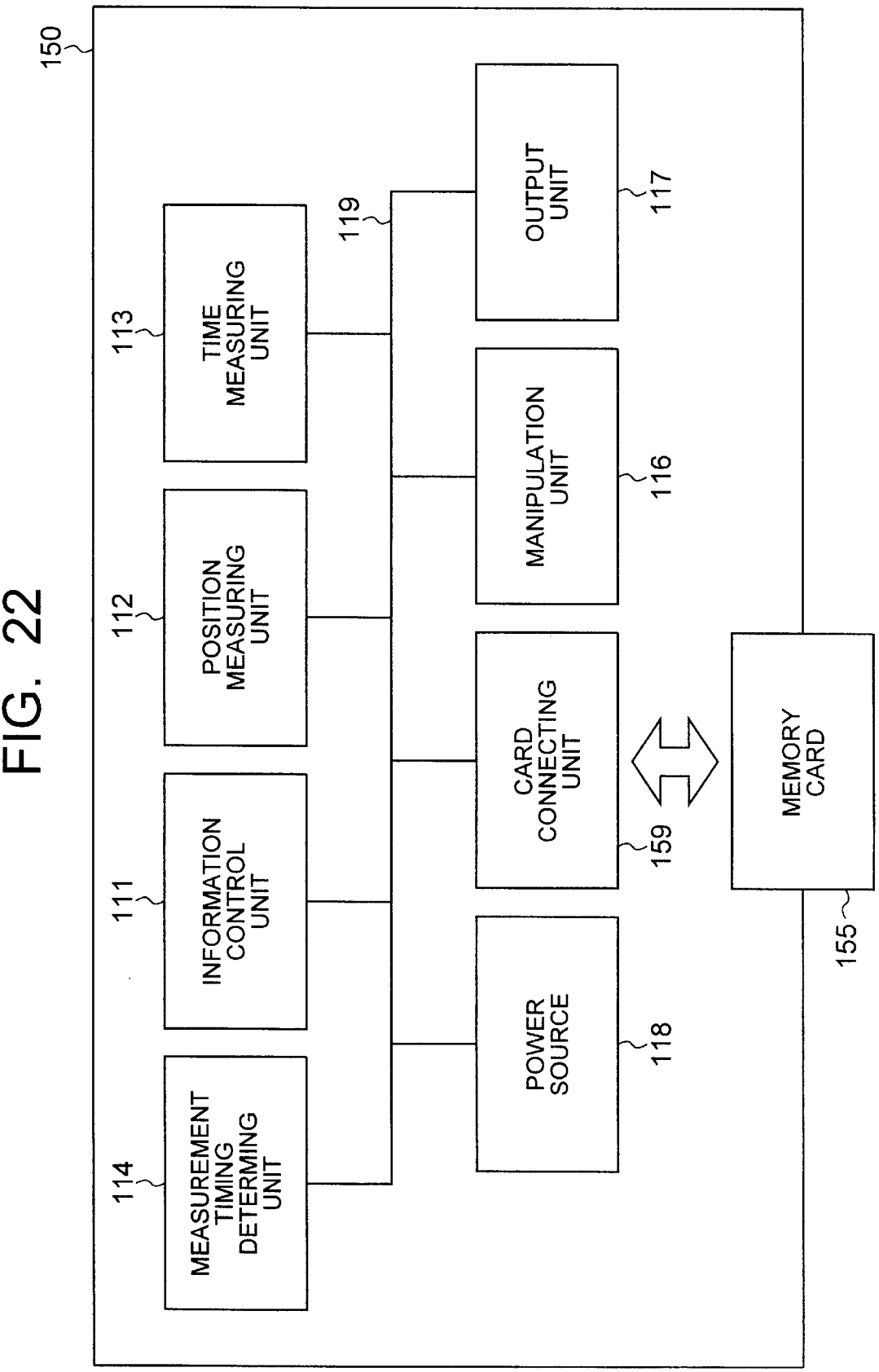
FIG. 22 is a block diagram showing still a further example of a configuration of a position history recorder as an example of a physical distribution information collecting apparatus.

Next, the description will hereinbelow be given with respect to an example, which is different in the method of accumulating the position history information from the above-mentioned examples, with reference to FIG. 22. A position history recorder 150 shown in FIG. 22, instead of the recording unit 115 in the example shown in FIG. 10, includes a card connecting unit 159, and a memory card 155 which is detachably attached to the card connecting unit 159.

Figure 23:
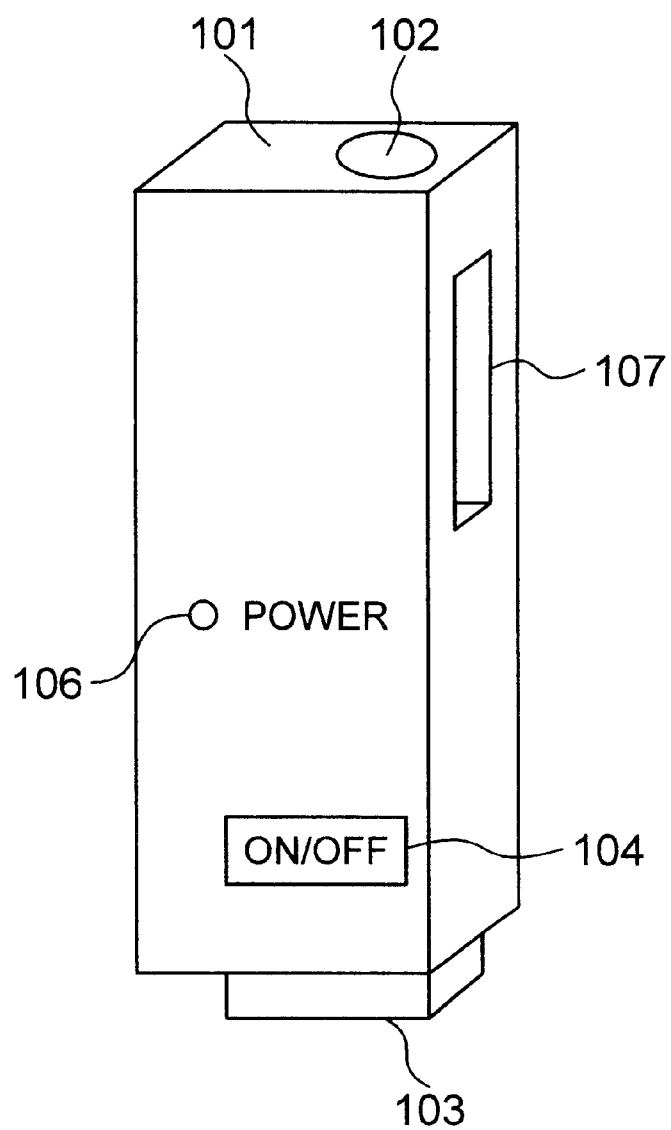
FIG. 23 is a perspective view showing an exterior appearance of another example of a position history recorder.

While the exterior appearance thereof is basically the same as that shown in FIG. 6A, as shown in FIG. 23, it is different therefrom in that the side face has a card slot 107. To the card slot, for example, a compact flash memory card or the like can be attached.

In this memory card, the history information containing the above-mentioned position information and time information is stored. Since the memory cards having the various kinds of storage capacities come onto the market, one which is selected as may be necessary can be employed. In this example, the position information of the product can be acquired by withdrawing the memory card 155.

Each of the above-mentioned examples is the example of the position history recorder which is suitable for the case where after the position information and the time information which have been acquired are temporarily accumulated, both or one of them are(is) read out to be utilized. Next, the description will hereinbelow be given with respect to an example of the position information acquiring apparatus which is suitable for the case where the acquired information is sent to the position information service company as may be necessary.

Figure 24:
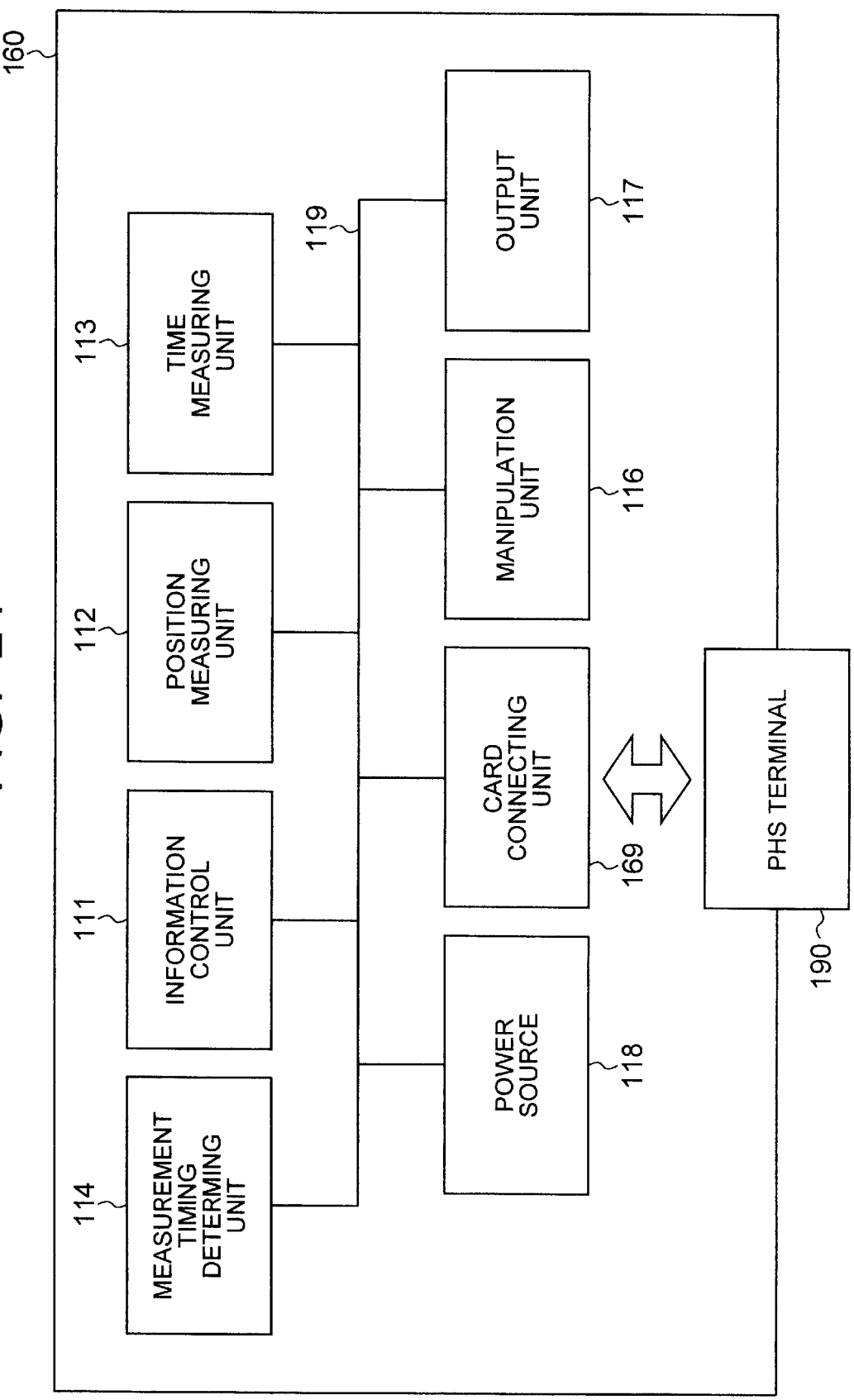
FIG. 24 is a block diagram showing an example of a configuration of a position information acquiring apparatus as one example of a physical distribution information collecting apparatus.

A position information acquiring apparatus 160 shown in FIG. 24 is an example in which the apparatus 160 includes a card connecting unit 169 instead of the recording unit 115 in the above-mentioned position history recorder shown in FIG. 10, a PHS terminal 190 of a card type is attached as the cellular line terminal to the card connecting unit 169. That is, at the time when there has been provided the state in which the position information and the time information can be acquired from the position measuring unit 112 and the time measuring unit 113, respectively, the information control unit 111 instructs the PHS terminal 190 to send the data for the position information service company, and at the time when the call becomes possible, delivers the data of the position information and the time information to the PHS terminal 190. In this connection, the identifier which is previously given to the position information acquiring apparatus 160 is sent together therewith.

By the way, there may be adopted the procedure in which if at a time point when having been instructed to carry out the transmission, it is difficult to carry out the transmission due to the electric wave situation or the like, then the PHS terminal 190 does not carry out the transmission, but accumulates the data of the position information and the time information which have been delivered from the information control unit 111 in its memory, and at a time point when there has been provided the state in which the transmission becomes possible, transmits the accumulated data.

In addition, the PHS terminal 190 may accumulate the data of the position information and the time information which have been delivered from the information control unit 111 in its memory to send the data for the position information service company at a time point when the accumulation amount has reached a certain degree.

As the PHS terminal, one which is not of the card type may also be employed. In this case, the PHS terminal of interest is constructed in such a way as to be electrically connected to the output unit 117.

In this example, the acquirement of the position information and the time information is basically the same as that in the example shown in FIG. 10. But, a point of difference is that the position information and the time information which have been acquired are sent from the PHS terminal 190 as the wireless terminal to the position information service company 1. In this connection, with respect to the position history recorders 120 to 150 as well shown in FIG. 16 to FIG. 20, the position information and the time information which have been acquired may be sent from the PHS terminal 190 to the position information service company 1.

In a position information acquiring apparatus 170 shown in FIG. 25, the position measurement timing is determined with as a start an inquiry to the PHS terminal 190 as the wireless terminal, and on the basis of the position measurement timing thus determined, the position information and the time information are acquired. Therefore, the measurement timing determining unit is omitted here. The position information and the time information which have been acquired are sent from the PHS terminal 190 as the wireless terminal to the position information service company 1.

Figure 26:
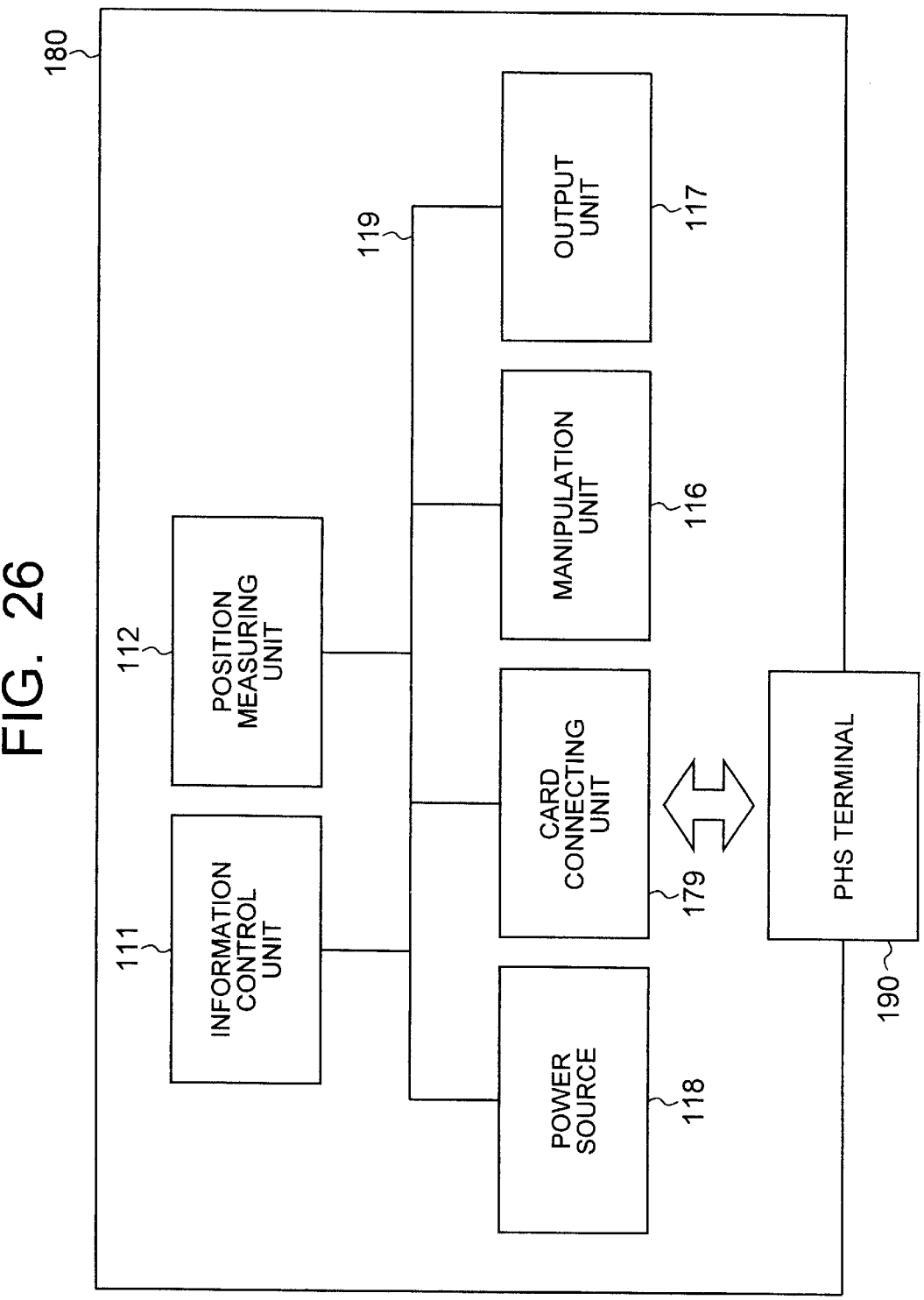
FIG. 26 is a block diagram showing still another example of a configuration of a position information acquiring apparatus as one example of a physical distribution information collecting apparatus.

In a position information acquiring apparatus 180 shown in FIG. 26, the position measurement timing is determined with as a start an inquiry to the PHS terminal 190 as the wireless terminal, and on the basis of the position measurement timing thus determined, the position information is acquired, and also the time information is obtained by utilizing the clock which the PHS terminal has. Therefore, both of the measurement timing determining unit and the time measuring unit are omitted here. The position information and the time information which have been acquired are sent from the PHS terminal 190 as the wireless terminal to the position information service company 1.

Figure 27:
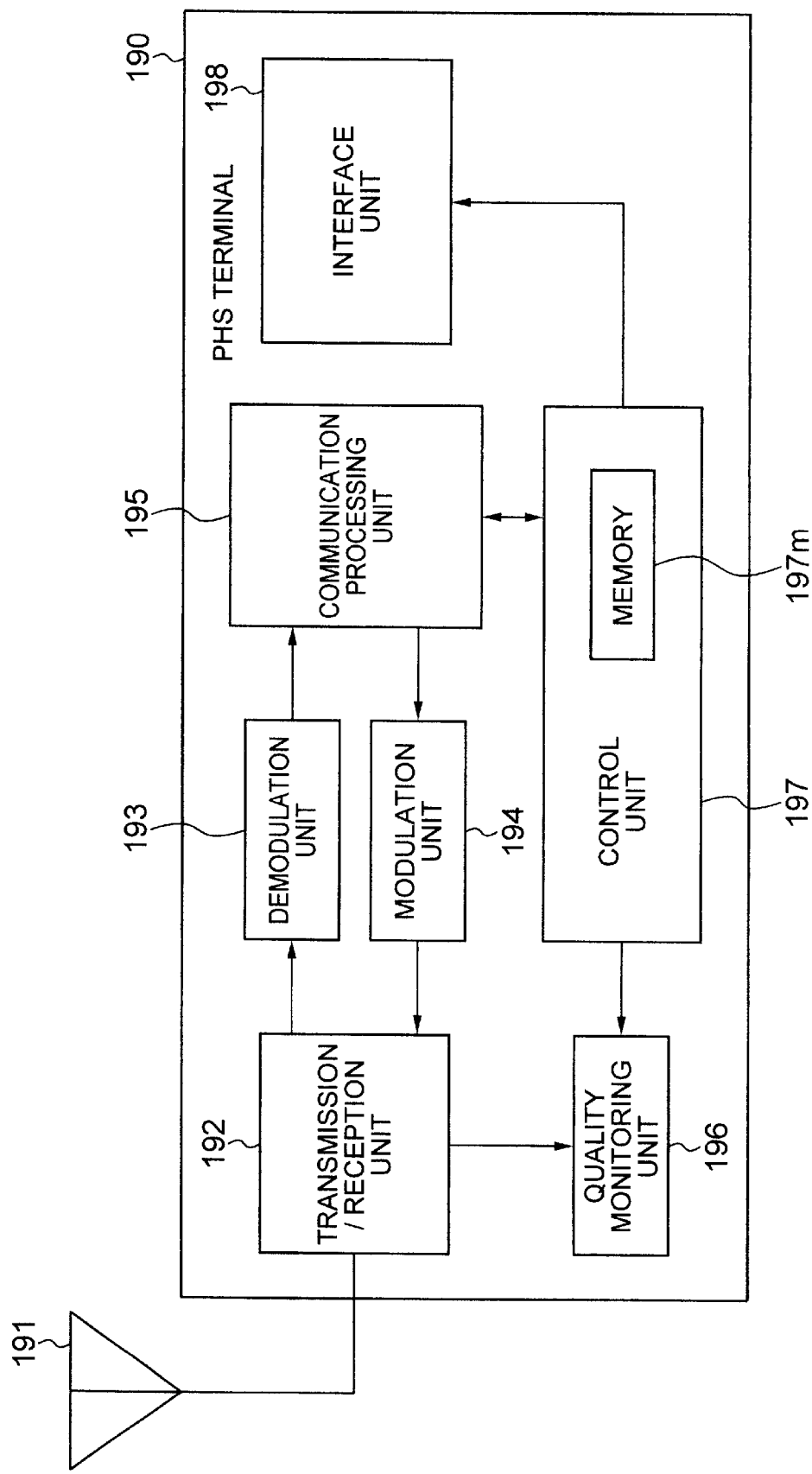
FIG. 27 is a block diagram showing an example of a configuration of a PHS terminal which is used in a configuration of a position information acquiring apparatus.

FIG. 27 shows the outline of a configuration of the PHS terminal as an example of the cellular wireless terminal which is employed in the present invention. The PHS terminal shown in FIG. 27 is attached to the card slot of the mobile computer or the like so that it can be configured similarly to that employed in the data communication or the like. That is, the PHS terminal includes an antenna 191, a transmission/reception unit 192 for transmitting/receiving an electric wave, a demodulation unit 193 for demodulating the received signal, a modulation unit 194 for modulating the signal to be transmitted, a communication processing unit 195 for subjecting the signal to be transmitted/received to the communication processing such as the TDMA (Time Division Multiple Access)/TDD processing, a quality monitoring unit 196 for monitoring the quality of the wireless electric wave, a control unit 197 for executing the processing such as the position registration, and an interface unit 198 for outputting the position information and the time information which have been acquired. In this PHS terminal 190, the position information is acquired using the position registering function, and also the time information is acquired using the clock which the PHS terminal itself has. The telephone number of the position information service company 1, and the telephone number and the like of the PHS terminal are recorded in a memory 197m.

In the examples shown in FIG. 24, FIG. 25 and FIG. 26, the PHS terminal 190 is merely used in the information transmission, the timing setting, or the time information measurement. But, the PHS terminal 190 can acquire the position information by using its position registering function. Therefore, the power source for the driving is electrically connected to the PHS terminal 190, whereby it is possible to construct the position information acquiring apparatus.

FIG. 5 shows an example in which such a PHS terminal is used as the physical distribution information collecting apparatus. The position of the product is registered in the PHS terminal without interruption, whereby it is found out that the PHS terminal is present in a certain range with as the reference the position of the base station which is provided in a relatively small area. Therefore, the position information of the base station and the map data are employed, whereby it becomes possible to be aware of the position of the product with the position of the base station as the reference. For example, in the case where the position of the storehouse is known, when that storehouse is present within the area where the PHS terminal is kept, it can be judged that the PHS terminal is present in the storehouse.

Next, the description will hereinbelow be given with respect to the operation when the position history information is acquired using the position history recording apparatus shown in FIG. 10 with reference to FIG. 28. Now, it is assumed that the power source is turned ON in the position history recording apparatus 110, and also the apparatus 110 is packed together with the product in the package box.

Figure 28:
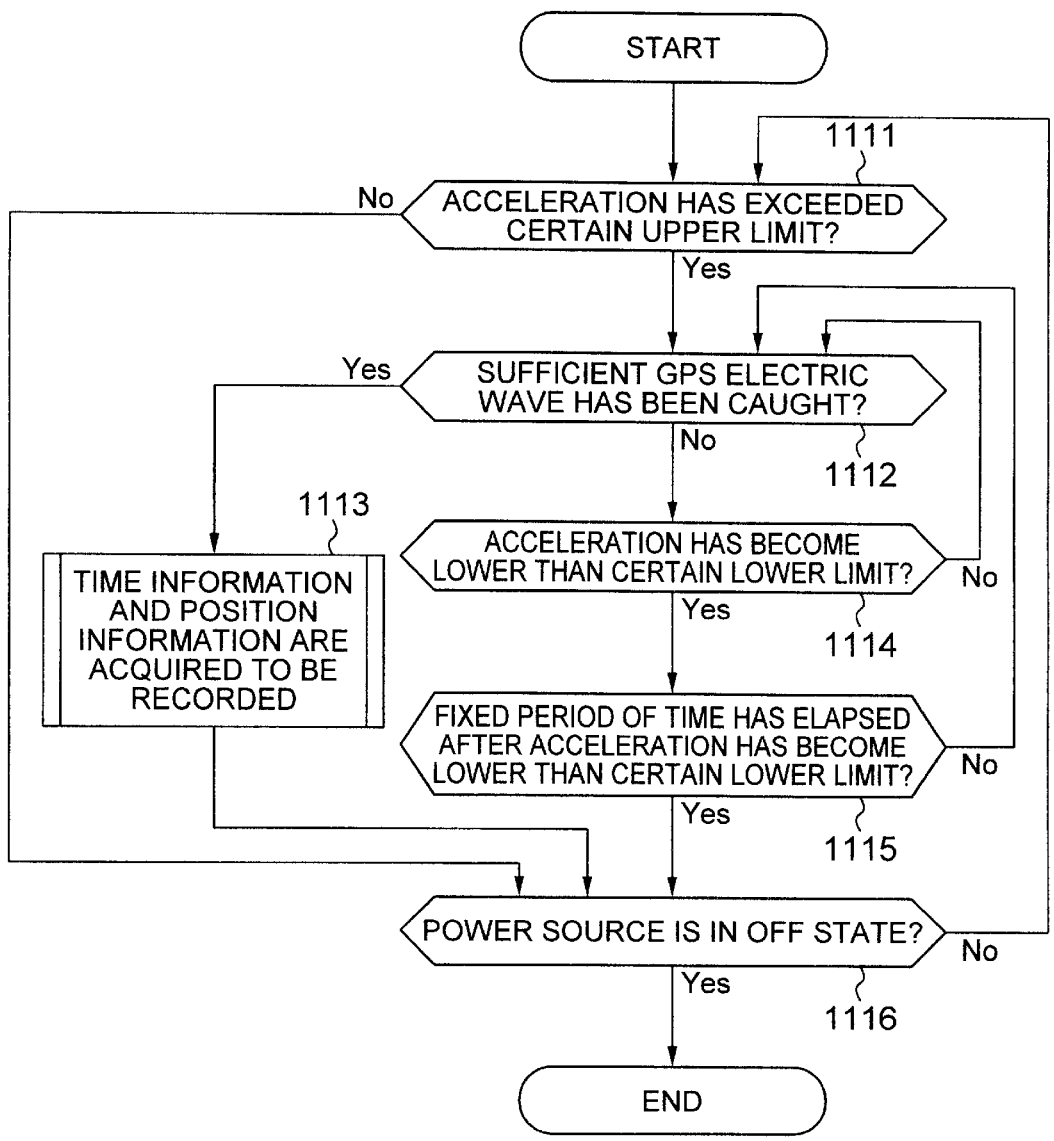
FIG. 28 is a flow chart useful in explaining the operation when acquiring position history information using position history recorder.

Now, as shown in a flow chart of FIG. 28, first of all, the CPU 111a of the information control unit 111 carries out the monitoring operation in accordance with the program recorded in the ROM 111b. Then, the CPU 111a monitors whether or not the timing pulse is outputted from the measurement timing determining unit 114 (Step 1111). That is, the CPU 111a monitors whether or not the timing pulse is outputted from the timing pulse generating circuit 114b along with that the acceleration equal to or higher than a certain level has been detected.

At the time when the timing pulse has been outputted, the position measuring unit 112 and the time measuring unit 113 are both activated so that they become the measurement states, respectively. Then, the CPU 111a checks the flag in the position measurement unit 112 to judge whether or not the magnitude of the electric wave radiated from the GPS satellite group S is sufficient and hence the position information has been able to be acquired (Step 1112). If it is judged in Step 1112 that the GPS electric wave having the sufficient magnitude has been able to be caught and hence the position information has been able to be acquired, then the processing proceeds to Step 1113. On the other hand, if it is judged in Step 1112 that the position information has not been able to be acquired, then the processing proceeds to Step 1114.

In Step 1113, the position information is read out from the position measuring unit 112 to record the position information thus read out in the recording unit 115. In addition, the time information at the time point of interest is read out from the time measuring unit 113 to be recorded in the same record as that of the above-mentioned position information. By the way, the control is carried out in such a way that the read-write driving circuit 115a of the recording unit 115 generates the write address and the data are not overwrtitten on the data which are previously written. The structure of the data in the recording unit 115, for example, as described above, is as shown in FIG. 15. Thereafter, except that the power source is turned OFF (Step 1116), the processing is returned back to Step 1111.

On the other hand, in Step 1114, it is checked whether or not the timing pulse is outputted from the measurement timing determining unit 114. That is, it is checked whether or not the position history recorder 110 is continuously accelerated. If it is judged in Step 1114 that the acceleration equal to or higher than a fixed level is applied thereto, since the timing pulse is outputted, the processing is returned back to Step 1112.

At this time, in response to the timing pulse, both of the position measuring unit 112 and the time measuring unit 113 are similarly in the operating state.

If it is judged in Step 1114 that the acceleration is lower than the fixed level and hence the timing pulse is not outputted, then it is checked whether or not a fixed period of time has elapsed (Step 1115). That is, the processings from Step 1112 to Step 1115 are continuously executed until a preset time has elapsed, and then the processing exits from this loop. Then, the processing is returned back to Step 1111 as long as the power source is not turned OFF.

Therefore, when the position history recorder 110 is accelerated together with the product, i.e., when the position history recorder 110 is likely carried out together with the product, since the timing pulse is generated, the position information and the time information are both required whenever the timing pulse is generated. Normally, in the occasion when the product is moved in shipping, stocking, taking out the product from the storehouse, the product is largely displaced, and hence the product is accelerated. Therefore, in such a situation, the position information and the time information can be frequently acquired. On the other hand, when the product is not moved because it is stocked in the storehouse, since the timing pulse is not generated, the measurement of the position information and the time information are not carried out. For this reason, even in the memory having the limited storage capacity, the necessary information can be selectively accumulated.

Figure 29:
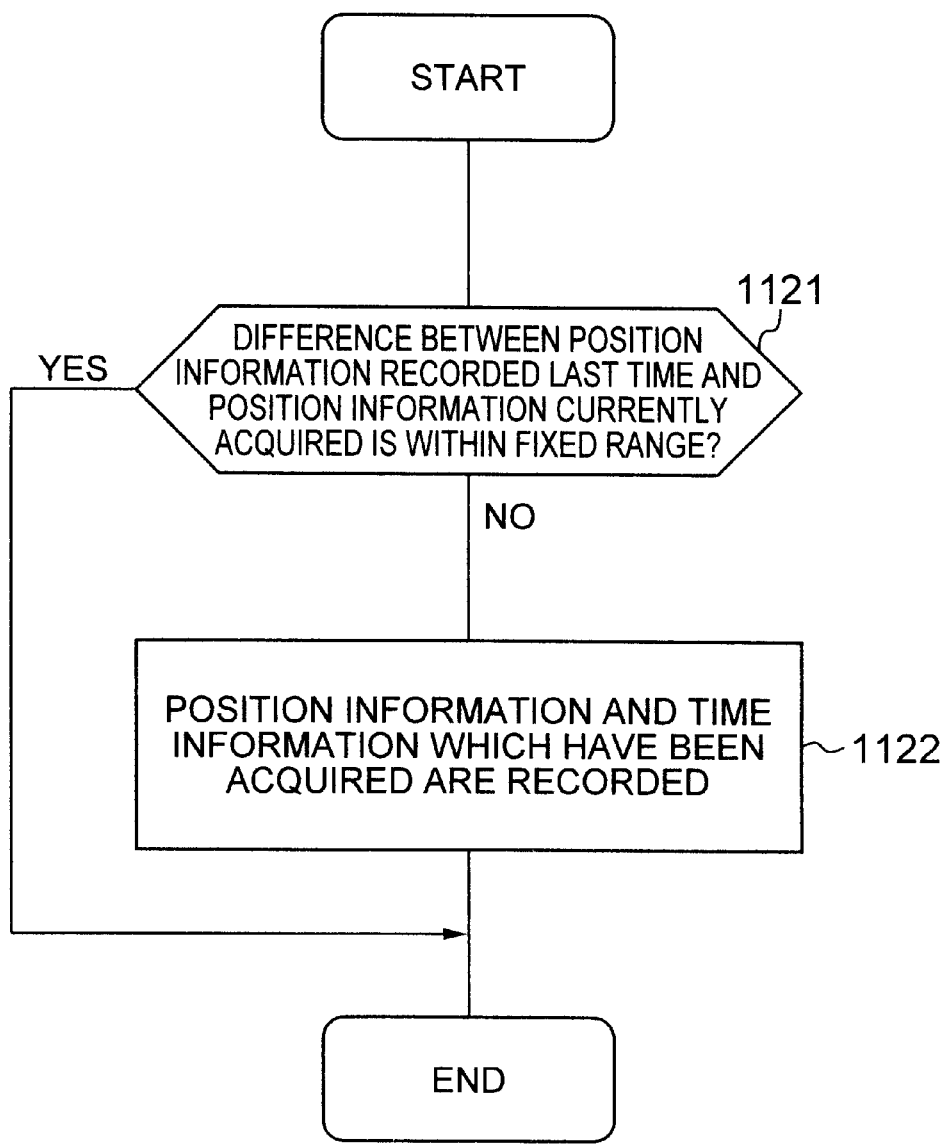
FIG. 29 is a flow chart useful in explaining a procedure when recording position information and time information, which have been acquired, with the capacity of a memory saved.
Figure 30:
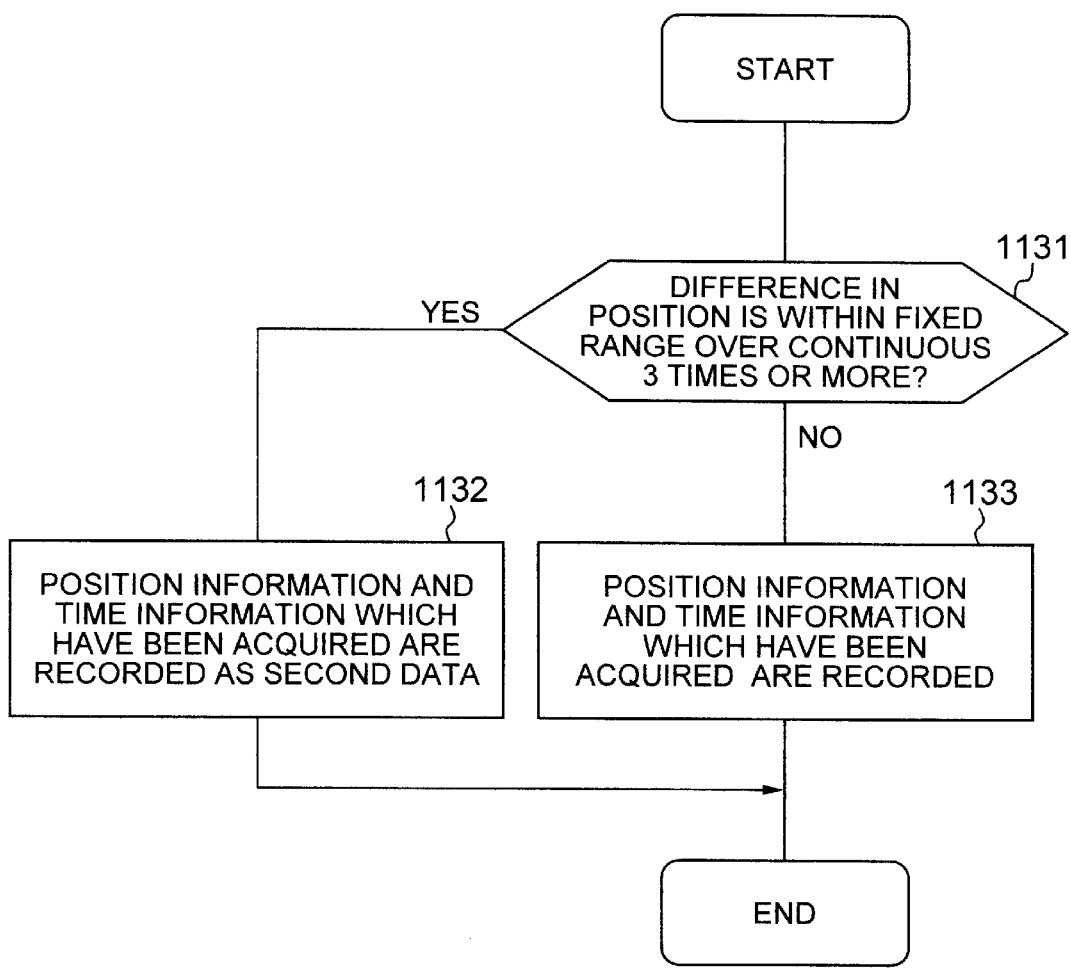
FIG. 30 is a flow chart useful in explaining another procedure when recording position information and time information, which have been acquired, with the capacity of a memory saved.

Next, examples of further saving the storage capacity of the memory will hereinbelow be described. These examples are shown in FIG. 29 and FIG. 30. In the example shown in FIG. 29, when the position information and the time information which have been acquired are stored in the recording unit 115, the CPU 111a reads out the position information which is stored in the storage address of the last time to compare the position information thus read out with the position information which has been currently acquired (Step 1121). If it is checked in Step 1121 that the difference in the position information which was recorded last time and the position information which is recorded this time falls within a predetermined range, then it is judged that the position of the product is not moved, and hence the position information and the time information which have been acquired are not recorded to complete the processing. On the other hand, if it is judged in Step 1121 that there is the difference therebetween, then the position information and the time information which have been currently acquired are stored in the specified storage address (Step 1122). Now, as the difference between the position which was obtained last time and the position which has been obtained this time, for example, the size of the storehouse or so may be adopted. The reason of adopting this size is for the purpose of coping with that the product is not yet shipped, but the position of the product is changed in the storehouse.

The example shown in FIG. 30 is the example in which the data when the position information acquired by the position history recorder 110 exhibits over the continuous three times or more the position in which the difference in the position therebetween falls in the predetermined range is handled in the different manner from that until now.

That is, the CPU 111a checks by referring to the recording unit 115 whether or not the position information which has been acquired exhibits over the continuous three times or more the position in which the difference in the position therebetween falls the predetermined range (Step 1131). If it is checked in Step 1131 that the difference therebetween falls within the predetermined range, then it is judged that the position of the product is not moved, and hence the position information and the time information which have been acquired are recorded as the second data in the recording unit 115 (Step 1132). On the other hand, if it is judged in Step 1131 that there is the difference therebetween, then the position information and the time information which have been currently acquired are stored in the specified storage-address (Step 1133). Now, as the difference between the position which was obtained last time and the position which has been obtained this time, for example, the size of the storehouse or so may be adopted. As a result, this, for example, can cope with the fact that the product is not yet shipped, but the position of the product is changed in the storehouse.

Above, the description has been given with respect to the physical distribution information collecting apparatus for carrying out the position information collection. Next, the description will hereinbelow be given with respect to the handling of the collected information.

Next, the description will hereinbelow given with respect to an example when the above-mentioned position history recorder 110 shown in FIG. 10 and the like are previously attached to the product. Such an apparatus does not need to be special. For example, it is sufficient to remove the position history recorder 110 from the product or in the example shown in FIG. 2 to remove the recording medium 155 from the product to deliver it to the position information service company.

On the other hand, in the case of the example shown in FIG. 4, the product needs to have the function of transmitting the mail. That is, the product in this case needs to be the electronic apparatus which is electrically connected to the communication network and which has the function of transmitting/receiving the information to/from the communication network. In other words, the product needs to be one including a communication processor for realizing the function of transmitting/receiving the information to/from the communication network, and a physical distribution information collecting apparatus which is provided connectably to the communication processor, e.g., the above-mentioned position history recorder 110.

Figure 31:
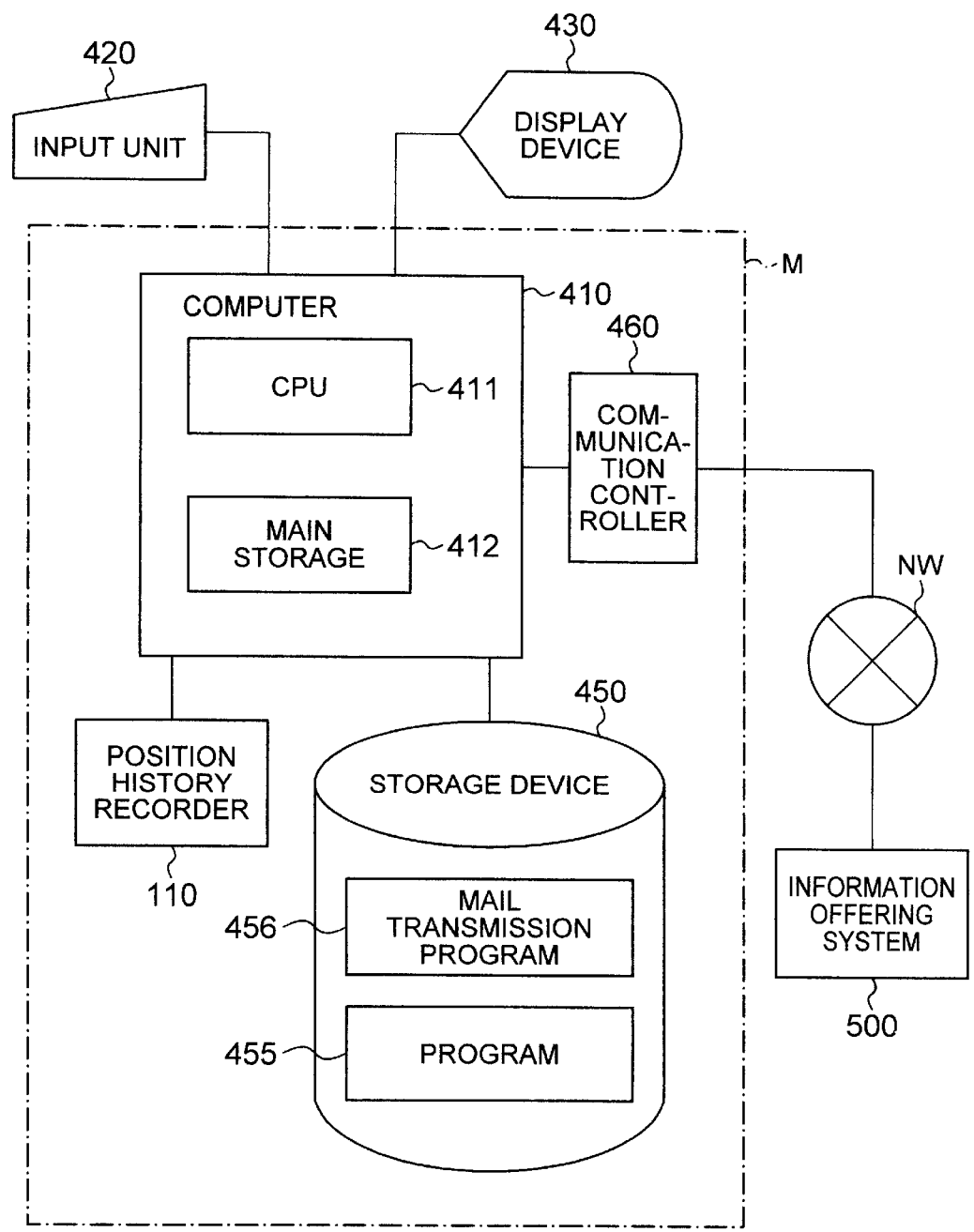
FIG. 31 is a block diagram showing an example of a configuration of an information processing unit as an example of an electronic apparatus which is provided with a position history recorder.

The typical product as the electronic apparatus of this sort is the information processor. An example thereof is shown in FIG. 31. The product M as the information processor shown in FIG. 31 includes a computer 410, a storage device 450, a communication controller 460 for carrying out the communication through the network, and a position history recorder 110. When the product M is used as the information processor, it becomes usable by further connecting electrically thereto an input unit 420 and a display device 430.

The position history recorder 110 is either self-contained in the product M or attached thereto. For example, it is conceivable that the output terminal 103 is attached to the connector or the like, whereby the information can be sent to the product M. For this reason, the position history recorder 110 is preferably configured in such a way that the output unit 117 and the output terminal 103 can be electrically connected to the connector having the standard such as IEEE1394, USB, RS232C or PCMCIA. In addition, the mail address is previously recorded in the recording unit 115 as the recording medium of the position history recorder 110.

In the product M, in a storage device 450, there is stored a program 456 for realizing the means for reading out, in addition to a program 455 of the operating system or the like, from the recording unit 115 as the recording medium of the position history recording apparatus 110, the mail address and the position history information recorded therein to generate the mail for the mail address thus read out containing the position history information as the transmission contents and also at the time when receiving the transmission instruction, to make a CPU 411 execute the processing of transmitting the mail of interest to execute the processing of transmitting/receiving the mail. This program, at the time when the computer is activated in the operable state, is activated to generate automatically the mail and keeps therein the transmission mail as the file. Then, when the computer 110 is placed in the environment in which the mail can be transmitted, and a user issues the instruction to transmit the mail for a provider, the mail which has been kept therein is transmitted for the destination. Therefore, the mail of the position history information is automatically transmitted without costing the special labor by a user. In addition, the transmission of the mail may also be carried out together with the online registration of a user.

In addition, the restrictions may be put on the program in such a way that the mail production for transmitting the position history information is carried out with the limited number of times as the limit. For example, it is conceivable that the restriction of producing only one mail is put thereon. This reason is that the mail having the same contents is prevented from being transmitted a plurality of times.

The position history recording information can be sent in the form of the mail from a communication controller 460 to a position information offering system 500 through a network NW.

In this connection, in order that the physical distribution information may be sent on the basis of this method, it is to be understood that the apparatus for collecting the physical distribution information is not intended to be limited to the apparatus shown in FIG. 10.

<With Respect to Position Information Offering System>

The position information offering system 500, as shown in FIGS. 1 to 5, is provided in the position information service company 1. Of course, for the position information service company 1, a service company may be specially established. Then, the information offering service may be offered by this company. In this example, the description will now be given with respect to an example in which the position information service company 1 is the subject of offering the service.

Figure 32:
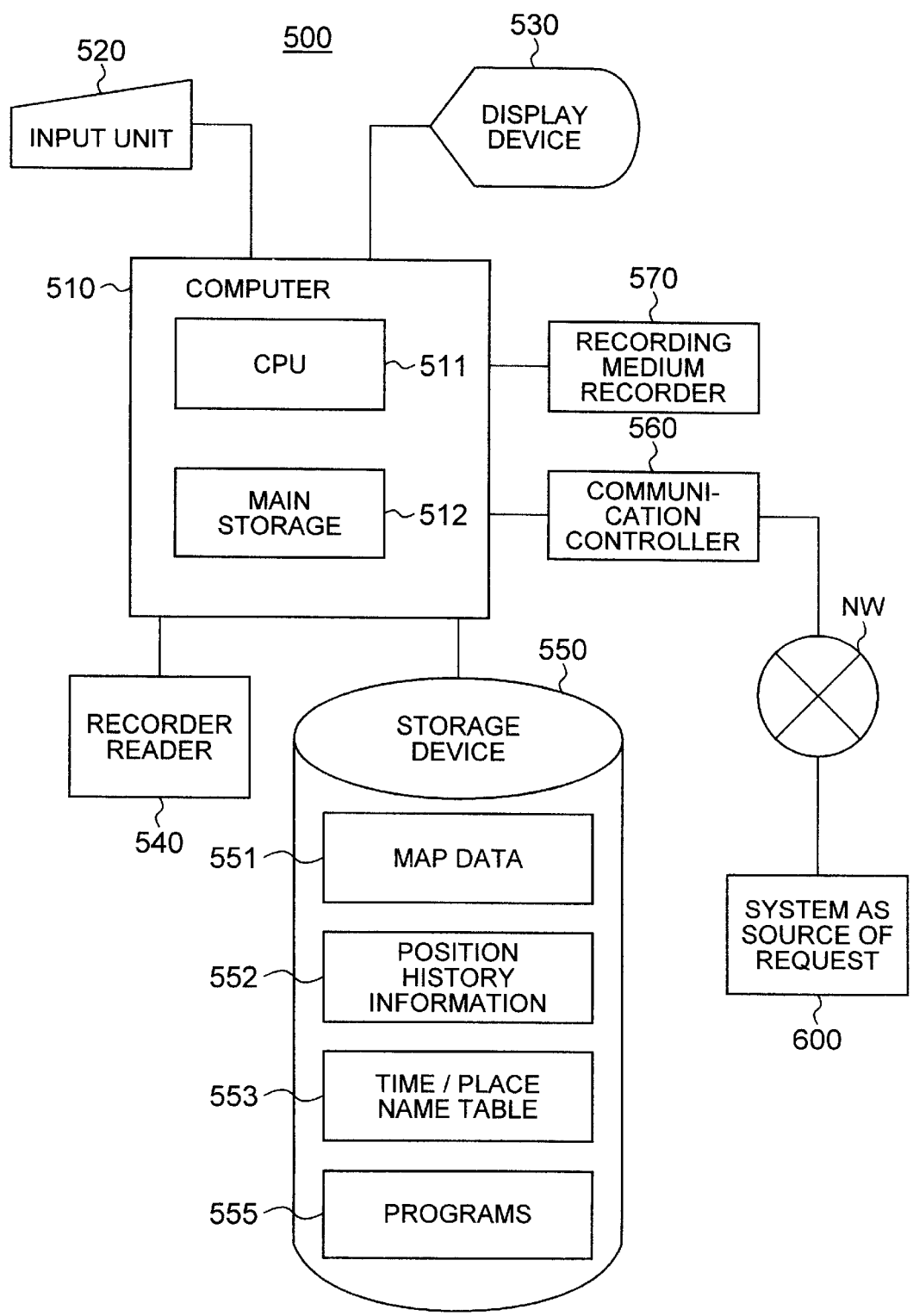
FIG. 32 is a block diagram showing an example of a hardware system configuration of a system for offering position information.

The position information offering system 500, for example, as shown in FIG. 32, includes a computer 510, an input unit 520 which is electrically connected to the computer 510, a display device 530, a recorder reader 540 for reading out the data from the above-mentioned position history recorder, a storage device 550 for storing therein the data and the program, a communication controller 560 for carrying out the communication through the network NW, and a recording medium recorder 570 for writing the data to the recording medium.

Map data 551 and programs 555 are both previously stored in the storage device 550. In addition, position history information 552 which will be read out later is also stored therein. Also, a time/place name correspondence table 553 for storing therein the time/place name correspondence data which are generated on the basis thereof is prepared (refer to FIG. 33). Of course, the data other than those, e.g., the charge data, the service offer supporting program and data, and the like are stored therein.

The computer 510 includes a central processing unit (CPU) 511 and a main storage 512, and loads the necessary program of the programs 555 which are stored in the storage device 550 to the main storage 512 to run the necessary program.

In this example, first of all, the position history information which has been read out from the recorder reader 540 is stored in the storage device 550, and also by referring to the map data 551, with respect to the positions contained in the position history information, the place names corresponding thereto, e.g., prefectures, cities, wards, towns and villages, house numbers, building names and the like are retrieved, and if the corresponding place name is present, then it is assumed that the product is present in that position. Then, the position information and the time information, and the place name are made correspond to each other to be stored in the time/place name correspondence table 553 shown in FIG. 33. In this connection, when the name of the institution which is located in the corresponding house number, e.g., the name such as a factory Y of a company X; a storehouse B of a trading company A; or the like is present in the map data, that name is acquired to be made correspond to the above-mentioned data. As a result, as shown in FIG. 33, in the time/place name correspondence table 553, a date 5531, a time 5532, a place name 5533, and a place 5534 where the product is kept are recorded in the form of one record. This procedure is carried out with respect to the data contained in the position history information. By the way, since the time/place name correspondence table 553 is generated every position history recorder, the data in these tables can be distinguishably processed. Therefore, when merging the data in the tables, the identifiers for identifying the respective data are given thereto. Of course, the identifiers may be previously given thereto. As for the identifier, the identifier which is previously given to the position history recorder may also be employed.

With respect to the position information or the like, in addition to the processing of reading out the position information or the like by the recorder reader 540, as shown in FIG. 4, the position information or the like may be sent in the form of the mail from the product in some cases. In such cases as well, the function of receiving the mail is prepared. Then, at the time when having received the mail, the position information offering system takes therein the position information contained in the mail. The processing after this is as has already been described. In addition, the position information or the like, as shown in FIG. 3 and FIG. 5, may be sent through the PHS company in some cases. In such cases, unlike the processing of taking in the position information by the above-mentioned recorder reader 540, the system takes therein the position information or the like by receiving the data which has been sent through the PHS company. For this reason, the data which have been sent are accumulated in the storage device 550 every identifier (the telephone number may be available) of the source of the data transmission.

In addition, in the case where an inquire is made to each of the position information acquiring apparatuses to acquire the position information or the like, an inquire program is previously prepared and the inquire is made to each of the position information acquiring apparatuses at a predetermined inquire timing to acquire the position information or the like.

Next, the description will hereinbelow be given with respect to the position information offering service by the position information offering system 500 and the support service therefor.

The CPU 511 reads out the position history information 552 which is accumulated in the storage device 550, retrieves the map (the partial map) of a part containing the position exhibited by the position information from the map data 551, which is previously prepared, on the basis of the position information contained in the position history information 552 of interest, and carries out the output for showing visibly both of the resultant partial map and the symbol with which the position information contained in the position history information is shown on the map. The information of a plurality of products can be accumulated in the position history information 552 and the position of the products can be displayed on the map, respectively. Now, in the case where there are a plurality of products, the symbol may be distinguishably provided every product. In addition, in the case where there are a large number of products, the products which show the same movement may be collectively expressed with one symbol. In this connection, the number of products may be written down therewith. Further, the symbol may be changed in accordance with the kind of product.

With respect to that output, for example, the image thereof may be displayed on the display device 530 in the system of interest. In addition, that output may be sent to the system 600 as the source of the request through the network in accordance with the request. Further, the home page therefor is produced, and in response to the access from the enterprise as the source of the request, the output may also be converted into the data which is of the type which can be perused by the browser to be transmitted to the system 600 as the source of the request. In addition thereto, the output may be written to the portable recording medium, e.g., the recording medium such as the writable optical disk or the magneto-optical disk through the recording medium recorder 570 to be delivered in the form of the recording medium to the enterprise as the source of request. Of course, while not particularly illustrated, the printer may be electrically connected thereto to offer the output in the form of being printed on the papers.

In the above-mentioned visible output, the time information in the position of interest may be written in addition to the symbol. As a result, it becomes easy to track the movement locus of the product in terms of time.

By the way, the partial map, the display position of the symbol, and the data specifying the symbol form may also be linked to the above-mentioned time/place name table 553 in such a way as to have the position correspondence. As a result, by employing the time/place name table 553, the map and the symbol can be readily displayed.

In addition, it is also possible to offer the information by the technique which is different from the above-mentioned type. For example, the CPU 511, when reading out the position history information 552, can retrieve the position history information 552 with as the key the specified condition relating to the time. The setting of the key therefor can be received through the input unit 520. In addition, the procedure may also be adopted in which the received data is sent to the enterprise as the source of the request through the network, and the input of the received data is received to accept the inputted instruction through the network. Further, the setting therefor may also be previously carried out.

In any case, first of all, the CPU 511 extracts the position information obedient to the condition relating to the specified time from the position history information 552, and on the basis of the position information thus extracted, retrieves the map of a part containing the position exhibited by the position information of interest from the map data 551 which are previously prepared. Then, the CPU can carry out the output for showing visibly the resultant map and the symbol with which the position exhibiting the position information of interest is shown on the map. This retrieval may also be carried out using the above-mentioned time/place name table 553. In this connection, in the specified condition relating to the time, the specification of a certain time point in units selected from days, months and years, the specification exhibiting the time of start and the time of end of a period of time, the specification of an arbitrary year, month and day, and the specification of an arbitrary year, month and day, and time are all contained as the choices.

As described above, the inquiry of the information exhibiting the situation of the movement of any one or more products can be received through the network. In this case, as described above, the output is made to the source of the inquiry through the network. In this connection, the data for showing visibly the map in which the position exhibited by the position information is contained, and the symbol with which the position exhibiting the position information is shown on the map can be transmitted to the source of the inquiry through the network. At this time, as may be necessary, the program in accordance with which those data are displayed may be sent together therewith. The system as the source of the inquiry, e.g., the system 600 as the source of the request, in response thereto, may display the information relating to the place where the product is kept, together with the map, on the display device.

In addition, the data for showing visibly the map in which the position exhibited by the position information is contained, and the symbol with which the position exhibiting the position information of interest is shown on the map may be recorded in the portable recording medium through the recording medium recorder 570 to be outputted. In this connection, as may be necessary, the program in accordance with which those data are displayed may be recorded together therewith in the recording medium.

Next, the description will hereinbelow be given with respect to the case where the offer of the information exhibiting the movement situation of the product is supported by the above-mentioned system. This system can be realized using the above-mentioned hardware system. Of course, this system may also be realized using another hardware system.

The program for realizing these systems is stored in the programs 555 of the storage device 550. The CPU 511 runs that program, thereby realizing the following means. That is, there are realized means for displaying the screen on which the specification of the form of the information collection is recorded; means for on the basis of the received specification, determining the position information acquiring apparatus which is used to acquire the position information exhibiting the movement situation of the product; and means for outputting the determination result. Now, the means for displaying the screen on which the specification is received makes a display device 630 of a system 600 as the source of the request display the reception screen. Of course, the reception screen may be displayed on the display device of the means for displaying the screen on which the specification is received. In accordance with this means, there is carried out display 631 for receiving the selection relating to whether the accumulation collection method of reading out collectively the movement situation information stored in the position information acquiring apparatus or the non-periodical collection method of reading out the movement situation information in a period of time of collecting the movement situation information is selected. In addition, the means for displaying the screen on which the specification is received carries out display 632 for receiving the specification of a tracking period of time of collecting the movement situation information. Further, the means for displaying the screen on which the specification is received carries out display 633 for receiving an input of the number of position information acquiring apparatuses to be used.

The means for determining the position information acquiring apparatus, when the accumulation collection method is selected, determines that the position history recorder which has not the wireless communication function, but has the function of accumulating the movement situation information, e.g., the apparatus which is shown in any one of FIG. 10, FIG. 16, FIG. 18, FIG. 20 and FIG. 22 is employed. Which apparatus of those apparatuses the means for determining the position information acquiring apparatus selects can be previously selected or can be determined on the basis of the input of the desire of a user. On the other hand, when the non-periodical collection method is selected, the means for determining the position information acquiring apparatus determines that the apparatus which has the wireless communication function, e.g., the apparatus which is shown in any one of FIG. 24, FIG. 25 and FIG. 26 is employed. Which apparatus of those apparatuses the means for determining the position information acquiring apparatus selects can be previously selected or can be determined on the basis of the input of the desire of a user.

In addition, the means for determining the collection apparatus determines that the collection apparatus of the selected method, i.e., the collection apparatus having the battery which can be operated for a specified period of time is employed.

In addition thereto, the system for supporting the offer of the information of the product movement situation further includes means for determining the charge required to offer the information of the product movement situation. This means, on the basis of the available unit price, the use period of time and the number of apparatuses to be used of the determined position information acquiring apparatus, determines the charge to output the information exhibiting the charge thus determined. The available unit price of the position information acquiring apparatus is previously prepared in the form of the data.

On the other hand, in the system for supporting the offer of the information of the product movement situation, the CPU 511 runs the program to further realize means for receiving a request to offer the collected information of the product movement situation. The means for receiving the offer of the request has the function of receiving the specification of the form of offering the information of the product movement situation. In this case, the means for determining the charge, on the basis of a predetermined available unit price, can determine the available charge in accordance with the specification of the offer form of information of the the product movement situation.

<With Respect to System as Source of Request>

Next, the description will hereinbelow be given with respect to a system for utilizing the information which the source of the request uses. The system 600 as the source of the request, as shown in FIGS. 1 to 4, is provided in the maker 2 which utilizes the position information service. Of course, a service utilizing company may be provided indepeneltly of the maker 2, and the utilization of the information may be carried out by that company. In this case, it is assumed that the maker 2 utilizes the information.

Figure 35:
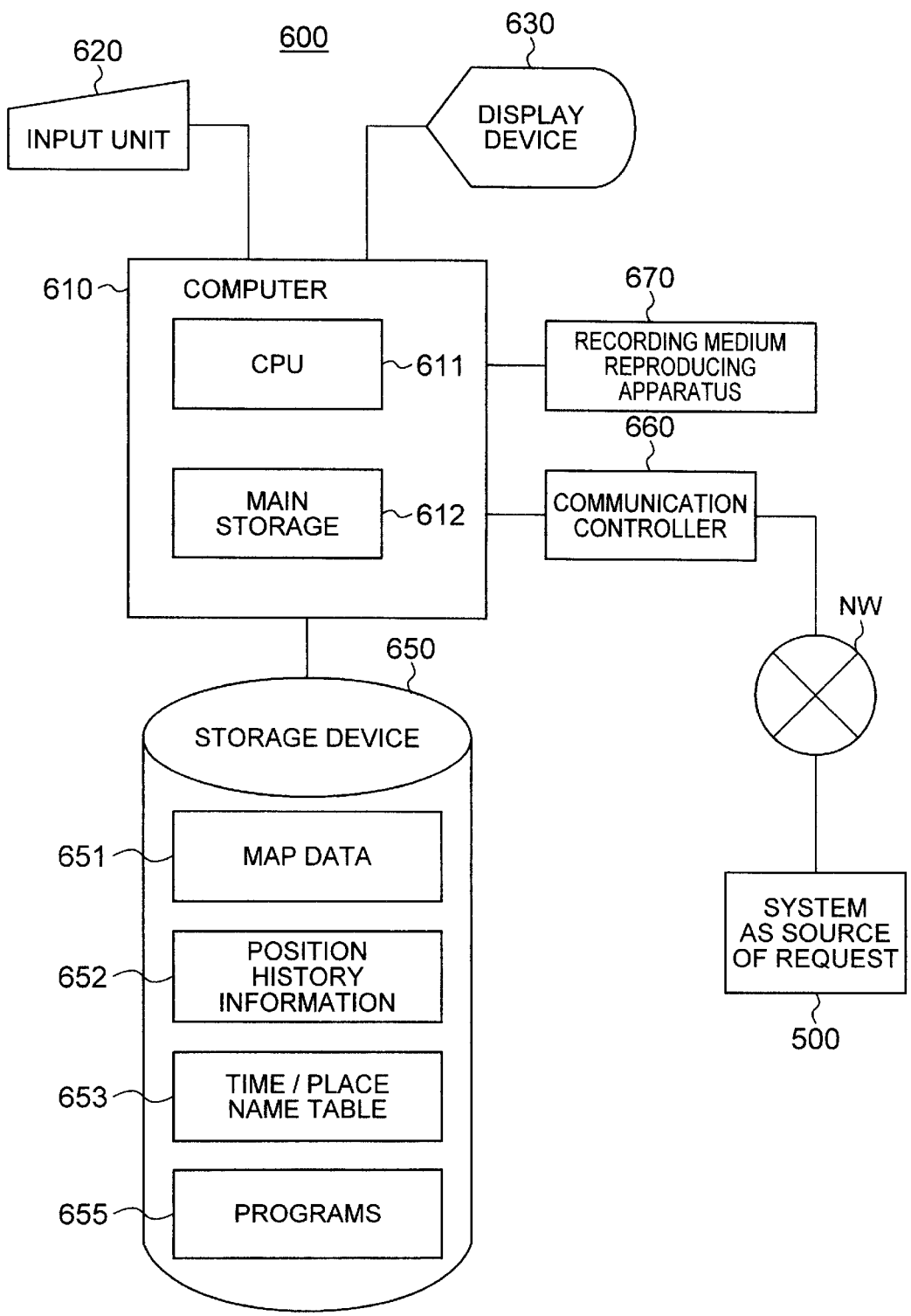
FIG. 35 is a block diagram showing an example of a configuration of a system as the source of the request.

A system as the source of the request 600, for example, as shown in FIG. 35, incldues a computer 610, an input unit 620 which is electrically connected to the computer 610, a display device 630, a storage device 650 for storing the data and the programs, a communication controller 660 for carrying out the communication through a network NW, and a recording medium reproducing apparatus 670 for reproducing the data which were written to the storage medium.

In the storage device 650, there are stored map data 651 which are offered from the information offering system 500, position history information 652, a time/place name correspondence table 653 for storing therein the time/place name correspondence data which are generated on the basis thereof, and programs 655 which are previously installed. In the programs 655, there are prepared the browser software for perusing the home page in addition to the operating system and the like.

The computer 610 includes a control processing unit (CPU) 611 and a main storage 612, and loads the necessary program of the programs 655, which are stored in the storage device 650, to the main storage 612 to run the necessary program thus loaded thereto.

Figure 34:
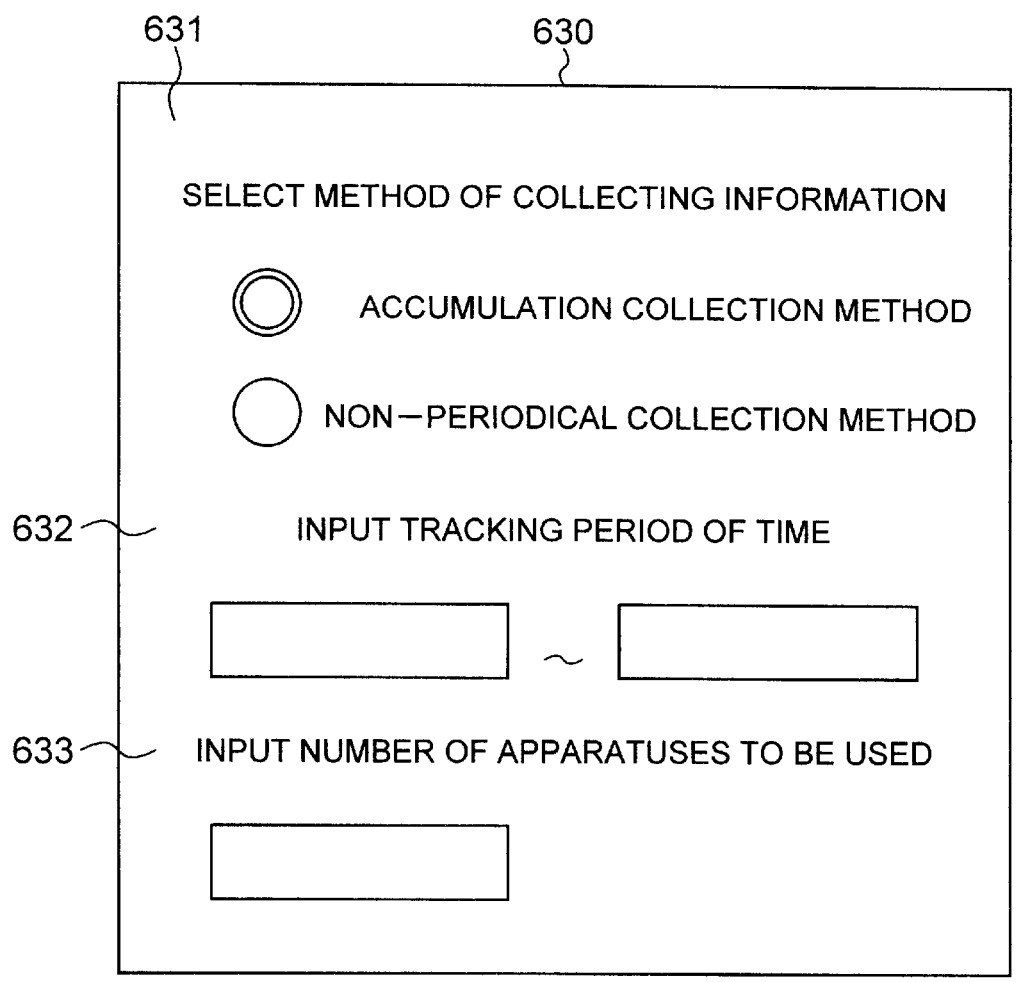
FIG. 34 is a schematic view useful in explaining the structure of a service receipt screen the information of which is sent from a position information offering system to a system as the source of them request.

In this system 600, first of all, the screen, shown in FIG. 34, which is sent from the position information offering system 500 and on which the service is received is displayed to receive the input therefor. The inputted instruction is transmitted to the system 500 for offering the information exhibiting the product movement situation through the network NW. Then, the system 500 for offering the information exhibiting the product movement situation, in accordance with instruction as described above, selects the position information acquiring apparatus, and determines the number of necessary apparatuses to decide the charge. Then, the system 500 for offering the information exhibiting the product movement situation informs the system 600 as the source of the request of the determination result. If the system 600 as the source of the request admits this result, then the necessary apparatus(es) is(are) offered to the source of the request. Then, as described above, the offered position information acquiring apparatus(es) is(are) packed together with any one or all of the group of products M, or is(are) mounted thereto. Thereafter, the information is acquired from the apparatus which has been withdrawn to send the various kinds of data for the information offer which are generated on the basis of the information thus acquired, i.e., the above-mentioned map data, the position history record and the like, and the program for the display to the system 600 as the source of the request. Thus, in response thereto, the system 600 as the source of the interest displays the map and the like on the screen.

<Attendant Services Utilizing Position Information and Time Information>

In the present invention, the attendant services utilizing the position information, the time information and the like which have been acquired can be carried out. As for the attendant services, for example, there can be taken the analysis services of analyzing the movement of the product on the basis of the position information and the time information of the product, the report services of when the specified condition is fulfilled, outputting the alarm, and the like. The analysis service, for example, is the service of collecting the position information and the time information of a plurality of products to accumulate the information relating thereto to analyze the measurement of the product to offer the analysis result. In addition, the report service is the service of retrieving the position information and the time information on the basis of the specified condition to carry out the report of the alarm or the like. These attendant services are basically carried out in the system for offering the position information. In addition, the offer of the attendant services, instead of being carried out in the position information offering system, or in parallel thereto, may be carried out in the system as the source of the request. In this case, the program and the data which are used to execute the attendant services are offered to the system as the source of the request so that the system as the source of the request can enjoy the services. In addition, the program and the data are offered to a third system so that it can offer the attendant services.

With respect to those, the accounting processing for the offer of the attendant services is executed together therewith.

As for the accounting processing, there are given the fixed accounting about the contract on the basis of which the attendant services are offered; the accounting based on the specific system for each offer of the services; the accounting as the use charge for the offered program and data; the accounting which is carried out on the combination of those systems; and so forth.

As the attendant services, the following ones are taken as an example. Of course, the services which can be offered by applying thereto the present invention are not intended to be limited thereto.

First of all, as the analysis services, there are given the fixed time analysis, the fixed point analysis, the selling analysis, the load time analysis, the benchmarking analysis, and the like. In addition, as the report services, there are given the stagnation alarm, the prohibition area alarm, the fixed time alarm, the leadtime alarm, and the like.

The fixed time analysis is such that the positions of the products at the specified time are retrieved, and on the basis of the obtained position information, the distribution of these positions is obtained. Then, the results are illustrated. When carrying out the illustration thereof, for example, it is conceivable that the position distribution is displayed on the above-mentioned map. For example, the histogram having the height as the number of products is three-dimensionally displayed on the two-dimensional map, whereby the distribution of the products can be shown. In addition, the distribution situation of the products with respect to a plurality of specified times can be shown in due order of times. For example, with respect to the distribution situation of the products, the daily change, the monthly change, the seasonal change, the yearly change or the like can be shown. At this time, for example, the different times may be written down in one screen therewith. In addition, the different times may be dynamically shown by switching the screen. Furthermore, for example, the above-mentioned histogram may be dynamically displayed in such a way that the heights thereof are changed as the time elapses.

The fixed point analysis is such that the receipt and expenditures of the products at the specified position are shown. The receipt and expenditures of the products can be shown in the form of the numeric values, the graphical representation or the like. For example, the receipt and expenditures of the products are shown in the form of the histogram exhibiting the numbers of products, the polygonal line graph exhibiting the change, or the like with the axis of abscissa as the time information and with the axis of ordinate as the stock number of products, the taking-out number of products, the number of existing products or the like. In addition, since in the present invention, it is possible to be aware of the movement of the individual products, the stagnating number of products obtained from the balance is not simply illustrated, but the period of time when the product of interest has been present until a certain time point can be obtained every product at the certain time point, and the stagnating time distribution at the time point of interest can be illustrated. As a result, for example, when the dispersion in the stagnating time is large, it can be estimated that the receipts and expenditures of the products at the position of interest are not uniformly carried out. In addition, the analysis at a plurality of fixed points can be continuously carried out. As a result, the throughput for each route extending from a certain fixed point to another fixed point can be analyzed. Then, this can be utilized to estimate the bottleneck relating to the flow of the products.

The selling analysis is such that the position information exhibiting the final position of the products which were shipped at the same time is acquired to obtain the distribution of these products. The results can be illustrated. For example, by illustrating the results on the map, it is possible to show the selling situation of the products. In addition, the time information is acquired together with the position information, whereby it is possible to be aware of the pace of the selling. Besides, it becomes possible to show the selling pace corresponding to the place. As a result, it is possible to offer the concrete selling result information.

The leadtime analysis is such that the movement leadtime from a certain fixed point to another fixed point, or the stagnating leadtime at a certain fixed point is obtained. The results are illustrated. The leadtimes are obtained with respect to a plurality of products, whereby the statistical processing such as the mean value, the maximum value, the minimum value and the like can be carried out.

The benchmarking analysis is such that a plurality of analysis results as described above are held, whereby the best practice is selected every product/trade category. Then, the newest result and the best practice are compared with each other, whereby it is possible to propose the method of improving the physical distribution.

Next, in the stagnating alarm, it is retrieved whether or not there is(are) the product(s) which is(are) stopped over the specified period of time and when the corresponding product (s) is(are) present, the alarm is outputted. This can be applied to the case where the information is collected on the basis of the accumulation method as well as the case where the position information and the time information are acquired in real time. That is, since becoming aware of that the product(s) has(have) been stagnated is necessary for being aware of the flow of the products, the necessity of the alarm is not limited to the real time.

In the prohibition area alarm, it is checked whether or not the product(s) is(are) present in the specified position and when the corresponding product(s) is(are) present, the alarm is outputted. Then, it is said that this case is effective to the case where the cellular wireless communication terminal since the possibility that the position history recorder(s) can not be withdrawn is high. Of course, it is also possible to acquire the information of this sort from the withdrawn position history recorder(s) to output the alarm. For example, when the product(s) which has(have) been out of the original distribution route to be distributed is aware of, this method can be employed. Now, as the prohibition areas, there are given the export prohibition country/area, the keep out area (e,g., the illegal abandonment area), the route other than the intended distribution route and the like.

In the fixed time alarm, it is checked whether or not the product(s) is(are) present in the specified position at the specified time and when the product(s) is(are) absent in the specified position at the specified time, the alarm is outputted. Now, as the specified time, there are given the specific date, the specific period of time, the specific day of the week, a certain time zone and the like.

In the leadtime alarm, it is checked whether or not the product has reached from the specified position up to another specified position within the specified leadtime, and when the product has not yet reached, the alarm is outputted.

With respect to the various kinds of alarms, they can be carried out independently and in addition thereto, the various combinations thereof can also be carried out. In addition, the procedure may also be adopted in which the above-mentioned analysis service is offered and using the analysis result, the alarm is carried out.

As set forth hereinabove, the information exhibiting the movement situation with respect to the products can be collected in such a way as to be adapted to the actual movement of the products. As a result, it is possible to make clear the flow of the products in the intermediate process which is not made conventionally clear. In addition, with respect to the flow of the products as well, the analysis from the various viewpoints can be carried out and also the services such as the alarms can be offered.

According to the present invention, the information exhibiting the measurement situation of the products can be readily collected. In addition, according to the present invention, the information exhibiting the movement situation of the products can be offered in the form of being easy to be utilized.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. A method of collecting transportation information of a shipped product, and supplying collected transportation information to a maker of the product comprising the steps of:

placing a position history recorder for recording histories of positions of a product under transportation in a state in which said position history recorder can be transported together with said product to be transported, wherein said position history recorder receives an electric wave signal and obtains position information of said position history recorder on the basis of the electric wave signal received according to a timing signal outputted from a timing generating apparatus included in said position history recorder; and records said position information obtained;

recording transportation information including said position information and time information in said position history recorder during transportation of said product; and collecting information representing a history of transportation of said product from said transportation information stored in said position history recorder and supplying collected information to a maker of said product.

2. A method of collecting and supplying transportation information according to claim 1, wherein said timing signal is generated at a predetermine timing.

3. A method of collecting and supplying transportation information according to claim 2, wherein a GPS apparatus is mounted to said position history recorder, and the electric wave radiated from the GPS satellite group is received by said GPS apparatus when said timing signal is generated, and on the basis of the received signal, the position information is acquired.

4. A method of collecting transportation information of a product according to claim 3, wherein said position history recorder obtains time information representing a time containing a data on the basis of said electric wave signal received, and said step of serially recording transportation information comprises a step of recording said position information and time information in a manner that said position information and time information are associated with each other.

5. A method of collecting and supplying transportation information according to claim 3, wherein said position history recorder obtains said time information from a timer included in said position history recorder when said timing signal is generated, and comprises a step of recording the time information and the position information in a manner that said time information and position are associated with each other.

6. A method of collecting and supplying transportation information according to claim 1, wherein when the position exhibited by the position information acquired by said position history recorder exhibits the position falling in a predetermined range with respect to the acquired position information of interest, the record is not added thereto.

7. A method of collecting and supplying transportation information according to claim 2, wherein an apparatus having an acceleration detector is employed as said position history recorder, and under the condition in which said acceleration detector detects the change in acceleration equal to or higher than a fixed level, the timing signal is generated.

8. A method of collecting and supplying transportation information according to claim 1, wherein the product to be transported is an apparatus including a function of carrying out the mail transmission; the state in which said position history recorder can be moved together with the product to be transported is the state in which said position history recorder is electrically connected to said apparatus; and the mail address is stored in the state of being able to be referred thereto by said apparatus in said position history recorder.

9. A method of collecting and supplying transportation information according to claim 8, wherein said apparatus has a program for realizing an online registration function and in response to an instruction to carry out the online registration, when carrying out the online registration by the program, reads out the transportation information from said position history recorder and also reads out the mail address to transmit the transportation information from the product to be transported towards the mail address.

10. A method of collecting and supplying transportation information according to claim 1, wherein said step of placing a position history recorder comprises a step of packing said position history recorder together with said product in a package box, and said step of collecting and supplying collected information comprises a step of collecting said position history recorder and supplying said position history recorder to said maker of said product.

11. A method of collecting and supplying transportation information according to claim 2, wherein said timing generating apparatus is programmed so as to generate said timing signal at predetermined intervals determined on the basis of a transportation pattern of the product.

12. A position history recorder for collecting transportation information of a shipped product and supplying collected transportation information to a maker of the product, comprising:

means for generating a timing signal at a predetermined timing;

means for receiving an electric wave according to said timing signal to acquire position information exhibiting the position where said position history recorder is kept on the basis of the received electric wave signal;

means having a recording medium for recording the acquired position information as transportation information together with time information in said recording medium;

means for receiving a read request to output the recorded transportation information; and means having a power source for supplying an electric power used to drive each of said means from said power source.

13. A position history recorder according to claim 12 wherein said means for acquiring the position information receives the electric wave radiated from the GPS satellite group to acquire the position information, when said timing signal is generated.

14. A position history recorder according to claim 13, wherein said means for acquiring the position information receives the electric wave radiated from the GPS satellite group to further acquire the time information exhibiting a time containing a date, and said recording means associates the position information and the time information, which have been acquired, with each other to record them as the transportation information.

15. A position history recorder according to claim 13, wherein said means for generating a timing signal comprises a timer, and said means having a recording medium for recording successively the acquired position information as transportation information acquires said time information from said timer, when said timing signal is generated, and records the time information and the position information in a manner that said time information and position information are associated with each other.

16. A position history recorder according to claim 12, further comprising an acceleration detector, wherein said timing signal is generated when an output of said acceleration detector shows a change in acceleration equal to or high than a fixed level.

17. A position history recorder according to claim 12, a mail address is stored in said recording medium.

18. A method of collecting transportation information of a product shipped and supplying collected transportation information to a maker of the product, comprising the steps of:

placing a position history recorder for recording transportation information including position information of a product under transportation and time information in a state in which said position history recorder can be transported together with said product to be transported;

recording transportation information according to a timing signal generated from a timing signal generating apparatus included in said position history recorder; and supplying information to said maker of said product after processing or analyzing said transportation information collected.

* * * * *